United States Patent
Parker

(10) Patent No.: US 12,221,346 B2
(45) Date of Patent: Feb. 11, 2025

(54) COLUMNAR-CARBON AND GRAPHENE-PLATE LATTICE COMPOSITE

(71) Applicant: Graphul Industries LLC, Lockport, IL (US)

(72) Inventor: Brian Michael Parker, Lockport, IL (US)

(73) Assignee: Graphul Industries LLC, Lockport, IL (US)

( * ) Notice: Subject to any disclaimer, the term of this patent is extended or adjusted under 35 U.S.C. 154(b) by 0 days.

(21) Appl. No.: 18/602,160

(22) Filed: Mar. 12, 2024

(65) Prior Publication Data

US 2024/0262691 A1    Aug. 8, 2024

Related U.S. Application Data

(60) Division of application No. 17/373,499, filed on Jul. 12, 2021, now Pat. No. 11,932,539, which is a
(Continued)

(51) Int. Cl.
*C01B 32/156* (2017.01)
*B82Y 40/00* (2011.01)
(Continued)

(52) U.S. Cl.
CPC .......... *C01B 32/156* (2017.08); *C01B 32/168* (2017.08); *C01B 32/184* (2017.08);
(Continued)

(58) Field of Classification Search
CPC ... C01B 32/156; C01B 32/168; C01B 32/184; C01B 32/16; C01B 32/194;
(Continued)

(56) References Cited

U.S. PATENT DOCUMENTS 6,756,025 B2    6/2004   Colbert et al.
6,800,369 B2   10/2004   Gimzewski et al.
(Continued)

FOREIGN PATENT DOCUMENTS

CN    105288663 A    2/2016
CN    109137141 A    1/2019
(Continued)

OTHER PUBLICATIONS

Wang, et al., Super-elasticity and deformation mechanism of three-dimensional pillared graphene network structures, Carbon 2017; 118: 588-596 (Year: 2017).*

(Continued)

*Primary Examiner* — Daniel C. McCracken
(74) *Attorney, Agent, or Firm* — Banner & Witcoff, Ltd.

(57) ABSTRACT

Methods of making a composite material may include the steps of depositing a plurality of fullerenes on a first graphene sheet forming a bottom plate, placing a second graphene sheet forming a top plate on a top of the plurality of fullerenes, and fusing the plurality of fullerenes to the first graphene sheet forming the bottom plate and the second graphene sheet forming the top plate, wherein the plurality of fullerenes are converted to fullerene-derived carbon columns, and wherein the composite material comprises a tensile strength in an x-axis parallel to the plane of the graphene sheets of at least 20 GPa.

10 Claims, 24 Drawing Sheets

Related U.S. Application Data continuation-in-part of application No. 17/220,581, filed on Apr. 1, 2021, now abandoned.

(60) Provisional application No. 63/003,526, filed on Apr. 1, 2020, provisional application No. 63/050,269, filed on Jul. 10, 2020.

(51) Int. Cl.
| | | |
|---|---|---|
| C01B 32/168 | (2017.01) | |
| C01B 32/184 | (2017.01) | |
| D04H 1/4242 | (2012.01) | |
| D04H 1/70 | (2012.01) | |
| H01M 4/583 | (2010.01) | |

(52) U.S. Cl.
CPC .......... D04H 1/4242 (2013.01); D04H 1/70 (2013.01); H01M 4/583 (2013.01); B82Y 40/00 (2013.01); C01P 2004/13 (2013.01); C01P 2004/24 (2013.01); C01P 2004/30 (2013.01); C01P 2004/64 (2013.01); C01P 2006/40 (2013.01); C01P 2006/90 (2013.01); D10B 2101/122 (2013.01); D10B 2401/063 (2013.01); D10B 2501/04 (2013.01)

(58) Field of Classification Search
CPC ....... D04H 1/4242; D04H 1/70; H01M 4/583; H01M 4/1393; H01M 4/366; B82Y 40/00; B82Y 30/00; C01P 2004/13; C01P 2004/24; C01P 2004/30; C01P 2004/64; C01P 2006/40; C01P 2006/90; D10B 2101/122; D10B 2401/063; D10B 2501/04; Y02E 60/10
See application file for complete search history.

(56) References Cited

U.S. PATENT DOCUMENTS

| | | |
|---|---|---|
| 7,008,713 B2 | 3/2006 | Nuber et al. |
| 7,351,604 B2 | 4/2008 | Cross et al. |
| 7,754,184 B2 | 7/2010 | Mercuri |
| 7,832,983 B2 | 11/2010 | Kruckenberg et al. |
| 7,850,778 B2 | 12/2010 | Lemaire |
| 8,425,735 B2 | 4/2013 | Barker et al. |
| 8,530,271 B2 | 9/2013 | Virkar et al. |
| 8,685,160 B2 | 4/2014 | Seung, II et al. |
| 8,872,140 B2 | 10/2014 | Jung et al. |
| 8,956,765 B2 | 2/2015 | Wang et al. |
| 8,992,807 B2 | 3/2015 | Kim et al. |
| 9,070,942 B2 | 6/2015 | Liu et al. |
| 9,543,057 B2 | 1/2017 | Nakamura et al. |
| 9,634,352 B2 | 4/2017 | Wang et al. |
| 9,721,734 B2 | 8/2017 | Ryu et al. |
| 9,776,378 B2 | 10/2017 | Choi |
| 9,777,132 B2 | 10/2017 | Kverel et al. |
| 9,783,422 B2 | 10/2017 | Muramatsu et al. |
| 9,870,871 B1 | 1/2018 | Campbell et al. |
| 9,878,302 B2 | 1/2018 | Wei et al. |
| 9,941,519 B2 | 4/2018 | Wang et al. |
| 10,053,366 B2 | 8/2018 | Tour et al. |
| 10,062,901 B2 | 8/2018 | Park et al. |
| 10,112,317 B2 | 10/2018 | Howe et al. |
| 10,214,422 B2 | 2/2019 | Lee et al. |
| 10,287,677 B2 | 5/2019 | Ozkan et al. |
| 10,424,490 B2 | 9/2019 | Kim et al. |
| 10,622,624 B2 | 4/2020 | Son et al. |
| 10,692,622 B2 | 6/2020 | Son et al. |
| 10,974,965 B2 | 4/2021 | Moon et al. |
| 11,198,611 B2 | 12/2021 | Lanning et al. |
| 2011/0300063 A1 | 12/2011 | Phillips, III et al. |
| 2012/0152725 A1* | 6/2012 | Barker ............. C01B 32/184 204/157.44 |
| 2015/0237929 A1 | 8/2015 | Greenhill et al. |
| 2016/0013481 A1 | 1/2016 | Jeong et al. |
| 2019/0207221 A1 | 7/2019 | Son et al. |
| 2019/0326064 A1 | 10/2019 | Maarouf et al. |
| 2020/0299828 A1 | 9/2020 | Gao et al. |
| 2020/0335761 A1 | 10/2020 | Yamazaki |
| 2021/0080200 A1 | 3/2021 | Shen et al. |
| 2021/0226195 A1 | 7/2021 | Stowell et al. |
| 2021/0359308 A1 | 11/2021 | Huang et al. |

FOREIGN PATENT DOCUMENTS

| | | |
|---|---|---|
| CN | 110015657 A | 7/2019 |
| EP | 2909135 A1 | 8/2015 |
| EP | 3136434 A1 | 3/2017 |
| EP | 2202202 B1 | 2/2018 |

OTHER PUBLICATIONS

Wesolowski, et al., Pillared graphene as a gas separation membrane, Phys. Chem. Chem. Phys. 2011; 13: 17027-17029 (Year: 2011).*
Ozturk, et al., Sandwiched graphene-fullerene composite: A novel 3-D nanostructured material for hydrogen storage, International Journal of Hydrogen Energy 2016; 41: 6403-6411 (Year: 2016).*
Song, et al., A finite element method to investigate the elastic properties of pillared graphene sheet under different conditions, Carbon 2018; 140: 210-217 (Year: 2018).*
Spyrou, et al., A novel route towards high quality fullerene-pillared graphene, Carbon 2013; 61: 313-320 (Year: 2013).*
Mirzayev, et al., Buckyball sandwiches, Sci. Adv. 2017; 3: e1700176, pp. 1-6 (Year: 2017).*
Dimitrakakis, et al., Pillared Graphene: A New 3-D Nework Nanostructure for Enhanced Hydrogen Storage, Nano Letters 2008; 8( 10): 3166-3170 (Year: 2008).*
Kirca, et al., Design and analysis of sandwiched fullerene-graphene composites using molecular dynamics simulations, Composites Part B 2015; 79: 513-520 (Year: 2015).*
Geng et al., "Uniform Hexagonal Graphene Flakes and Films Grown on Liquid Copper Surface", PNAS, at www.pnas.org/cgi/doi/10.1073/pnas. 1200339109, visited Jul. 12, 2021, pp. 7992-7996, May 22, 2012, vol. 109, No. 21 and "Supporting Information".
Jul. 26, 2022—(EP) EESR—App. No. 22166223.2.
Fu Huili et al., SWCNT-modulated folding-resistant sandwich-structured graphene film for high-performance electomagnetic interference shielding, Carbon, Elsevier Oxford, GB vol. 162, Mar. 2, 2020, pp. 490-496.
Wu Qingqing et al., Thermoelectricity in vertical graphene-C60-graphene architectures, Scientific Reports, vol. 7, No. 1, Dec. 1, 2017.
Vales Vaclav et al., Raman spectroscopy and AFM study of 12 C graphene/fullerenes C70/13C graphene heterostructure, Physica Status Solidi B, vol. 252, No. 11, Nov. 1, 2015, pp. 2418-2422.
Mao Dangxin et al., Fullerene-intercalated graphene nanocontainers for gas storage and sustained release, Journal of Molecular Modeling, Springer Berlin Heidelberg, Berlin/Heidelberg, vol. 26, No. 7, Jun. 6, 2020.
Ozturk Zeynel et al., Sandwiched graphene-fullerene composite: a novel 3-D nanostrcutred material for hydrogen storage, International Journal of Hydrogen Energy, Elsevier, Amsterdam, NL, vol. 41, No. 15, Mar. 28, 2016, pp. 6403-6411.
Erturk Ahmet Semie et al., Mechanical behavior of a novel carbon-based nanostructured aluminum material, Computational Materials Science, vol. 144, Mar. 1, 2018, pp. 193-209.
Kirca Mesut, Design and analysis of sandwiched fullerene-graphene composites using molecular dynamics simulations, Composites Part B, vol. 79, Sep. 1, 2015,l pp. 513-520.
Mirzayev Rasim et al., Buckyball sandwiches, Science Advances, vol. 3, No. 6, Jun. 2, 2017.
Radoslaw P. Wesolowski et al., Pillard graphene as a gas separation membrane, Phys. Chem. Chem. Phys. 2011; 13: 17027-17029 (Year 2011).

(56) References Cited

OTHER PUBLICATIONS

Georgios K. Dimitrakakis et al., Pillar Graphene: A New 3-D Network Nanostructure for Enhanced Hydrogen Storage, Nano Letters 2008; 8(10): 3166-3170 (Year: 2008).

Tetsup Tomiyama, et al. Solubility and partial specific volumes of C60 and C70, Chemical Physics Letters 1997; 264: 143-148 (Year: 1997).

Yongchao Wang, et al., Super-elasticity and deformation mechanism of three-dimensional pillared graphene network structures; (2017) 118 ESCARB 588-596 (002).

Cheng; "Graphene-Like-Graphite as Fast-Chargeable and High-Capacity Anode Materials for Lithium Ion Batteries"; article; Nov. 1, 2017; 14 pages; www.nature.com/scientificreports/.

Jan. 19, 2024—(CN) 1st Office Action—App 2022103493429.

\* cited by examiner

A- Base thickness-15 mm
B- Width of the fin-50 mm
C- Each Fin thickness-5 mm
D- Spacing between fins – 30.2 mm
E- Height of the Fin 90 mm

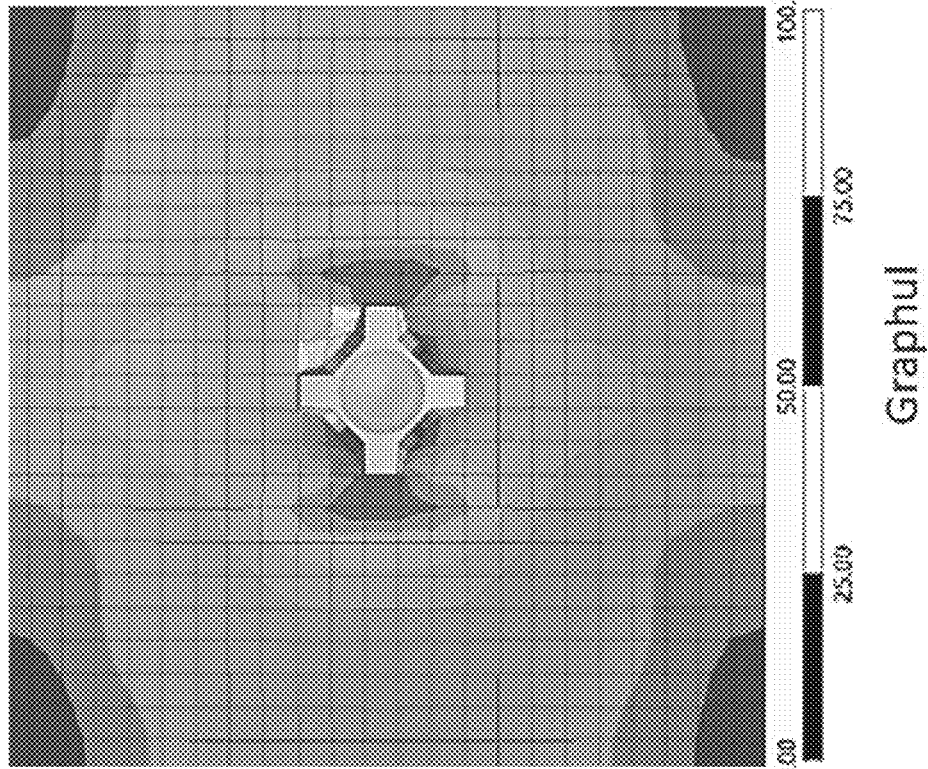
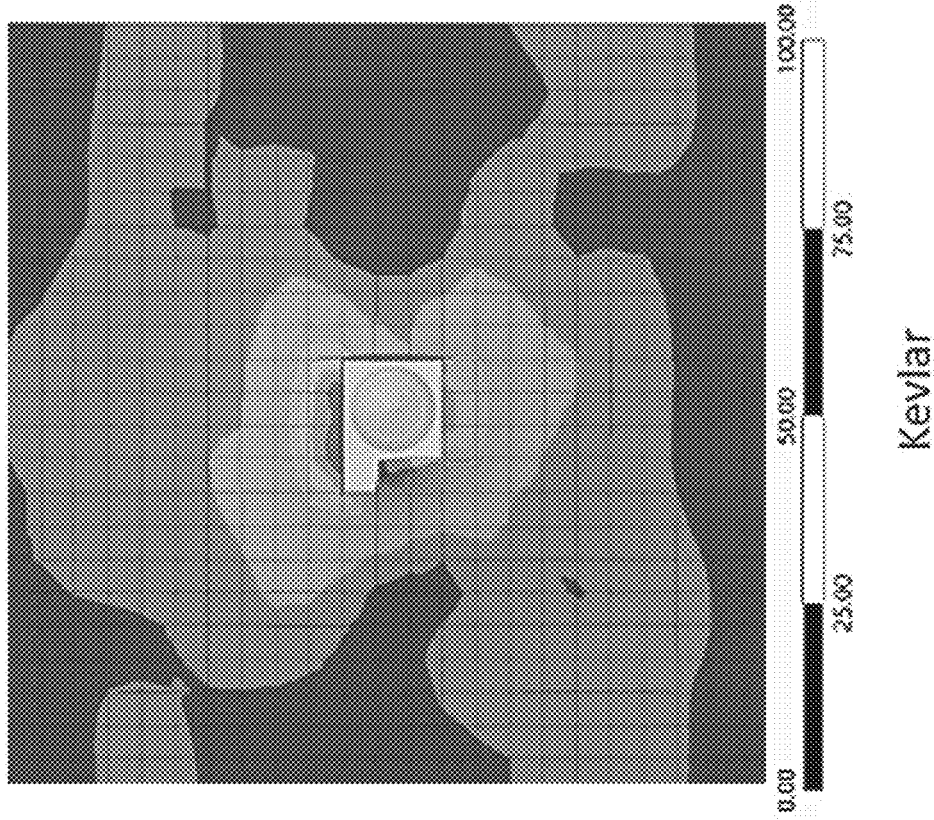
FIG. 12 ((cont.)

| Configuration | Tip Deflection (in) | Coupling Deformation (in) | Longitudinal Stress (ksi) | Longitudinal Strain (%) | Weight (lbs) |
|---|---|---|---|---|---|
| Flange coupling baseline (Steel) | 0.014 | 0.014 | 8.4726 | 5.7944 | 5.89 | 100.63 |
| Flange coupling—Graphul (Baseline geometry) ([±45]$_{ns}$) | 0.029 | 0.029 | 10.373 | 6.7719 | 5.9812 | 11.024 |
| Flange coupling—Graphul (Baseline geometry) ([0/+45/-45/-45/+45/0]$_{ns}$) Bi-axial layup | 0.0323 | 0.0323 | 10.339 | 7.32 | 5.963 | 11.024 |

FIG. 13

| Part | Total Deformation (mm) | Von Mises stress (MPa) | Maximum Principal stress (MPa) | Weight (g) |
|---|---|---|---|---|
| I-beam – Baseline (Baseline geometry) | 0.049 | 20.58 | 28.376 | 3.1 |
| I-beam – Graphul (Baseline geometry) | 0.093 | 24.8 | 32.22 | 0.34 |
| I-beam – Graphul (semi-optimized geometry) | 0.049 | 19.43 | 24.9 | 0.37 |

FIG. 14A

| Part | Material | Density (kg/m³) | Young's modulus (MPa) | Poisson's Ratio | Yield stress (MPa) | Ultimate Stress (MPa) |
|---|---|---|---|---|---|---|
| I-beam | ASTM-A36 steel | 7800 | 2*E5 | 0.26 | 250 | 550 |

| Part | Material | Density (kg/m³) | E11 (MPa) | E22 (MPa) | E33 (MPa) | Poisson's ratio v12 | Poisson's ratio v13 | Poisson's ratio v23 | G12 (MPa) | G13 (MPa) | G23 (MPa) |
|---|---|---|---|---|---|---|---|---|---|---|---|
| I-beam | Graphul | 860 | 1.267*E5 | 1.248*E5 | 0.809*E5 | 0.51 | 0.31 | 0.26 | 0.262*E5 | 0.17*E5 | 0.241*E5 |

FIG. 14B

| Part | Material | Density (kg/m³) | Young's modulus (MPa) | Poisson's Ratio | Ultimate Stress (MPa) | Ultimate Strain (GPa) |
|---|---|---|---|---|---|---|
| Pressure vessel | ASTM-A36 steel | 7800 | 2*E5 | 0.26 | 250 | 550 | 96.1* |

| Part | Material | Density (kg/m³) | Young's modulus (MPa) | Poisson's Ratio | Yield Stress (MPa) | Ultimate Stress (MPa) |
|---|---|---|---|---|---|---|
| Pressure vessel | IS 2062 | 7800 | 2*E5 | 0.26 | 250 | 410 |

| Part | Material | Density (kg/m³) | E1(MPa) | E2(MPa) | E3(MPa) | G12(MPa) | G13(MPa) | G23(MPa) |
|---|---|---|---|---|---|---|---|---|
| Pressure vessel | Graphul | 860 | 1.267*E5 | 1.248*E5 | 0.809*E5 | 0.262*E5 | 0.17*E5 | 0.241*E5 |
| Poisson's ratio, v12 | Poisson's ratio, v13 | Poisson's ratio, v23 | | | | | | |
| 0.51 | 0.31 | 0.26 | | | | | | |

FIG. 15A

| Case | Total deformation (mm) | Normal stress (X) (MPa) | Von Mises Stress (MPa) | Max Principal stress (MPa) | Shear stress (XY) (MPa) | Shear stress (YZ) (MPa) | Shear stress (XZ) (MPa) | Weight (g) |
|---|---|---|---|---|---|---|---|---|
| Pressure vessel baseline (IS 2062) | 3.7 | 5.2 | 8.8 | 10.3 | 3e-2 to 3e-5 | 7.6E-4 to 2.11E-6 | 2.3 | 249.38 |
| Pressure vessel-Graphit (baseline geometry) ((0/+45/45/90)s) quasi-isotropic laminate layup | 0.22 | 5 | 8.8 | 10.25 | 9.3e3 to 1.5E-5 | 3.4E-6 to 3.4e-2 | 5.1 | 37.321 |

FIG. 15B

COLUMNAR-CARBON AND GRAPHENE-PLATE LATTICE COMPOSITE

RELATED APPLICATION DATA

This patent application is a divisional of U.S. patent application Ser. No. 17/373,499, filed Jul. 12, 2021, which is a continuation-in-part of U.S. patent application Ser. No. 17/220,581, filed on Apr. 1, 2021, which claims the benefit U.S. Provisional Patent Application No. 63/003,526, filed on Apr. 1, 2020, and U.S. Provisional Patent Application No. 63/050,269, filed on Jul. 10, 2020. All of the above applications are incorporated herein fully by reference for any and all non-limiting purposes.

BACKGROUND

Fullerenes are carbon molecules that consists of carbon atoms connected by single and double bonds forming a closed or partially closed mesh, with fused rings of five to seven atoms. The molecule may be a hollow sphere, ellipsoid, tube, or many other shapes and sizes. For example, graphene is a one-atom-thick layer of carbon atoms arranged in a hexagonal honeycomb lattice forming a flat mesh. Graphene is known as the building-block of graphite. Graphene is the thinnest material known to man at one atom thick, is an excellent conductor of heat and electricity, and has interesting light absorption capabilities.

Carbon atoms may form cylindrical hollow tubes (carbon nanotubes "CNTs") with diameters from about 1 nanometer up to tens of nanometers and lengths up to millimeters. The unique one-dimensional structure and concomitant properties are unique to carbon nanotubes and may provide unlimited potential in nanotechnology-associated applications.

Disclosed herein is a composite material comprising a novel and unique combination of graphene sheets and carbon nanotubes. The novel columnar-carbon and graphene-plate lattice composite disclosed herein may be used as, but not limited to, electrical battery anodes, body armor, heat sinks, electrical conductors, and structural building system materials.

SUMMARY

This Summary introduces a selection of concepts relating to this technology in a simplified form as a prelude to the Detailed Description that follows. This Summary is not intended to identify key or essential features.

In some aspects, a composite material is disclosed. The material may include a first graphene sheet, a second graphene sheet, and a plurality of fullerenes may be positioned or deposited on the first graphene sheet, and the second graphene sheet may be subsequently positioned on top of the fullerenes. In some examples, the material may include multiple layers of graphene sheets with multiple fullerenes positioned between each of the graphene layers. In other examples, the fullerenes may be transformed into carbon nanotubes. In still other examples, the fullerenes may be positioned on the graphene sheets with a spacing between the individual fullerenes from about 0.5 nm to about 2 nm. In yet other examples, the fullerenes may be positioned on the graphene sheets with a spacing between the individual fullerenes of at least 0.5 nm. In some examples, the fullerenes may be positioned in a staggered pattern on the graphene sheets. In other examples, the fullerenes may be staggered in relation to fullerenes positioned on graphene sheets above and/or below. In another example, the fullerenes may be positioned in a uniform pattern on the graphene sheets. In still other examples, the fullerenes may have a diameter that may be at least 0.70 nm.

In other examples disclosed herein, the material may also include multiple fullerenes positioned or deposited on the second graphene sheet and a third graphene sheet may be positioned on top of the second plurality of fullerenes. In another example, a plurality of graphene sheets and a second plurality of fullerenes may be positioned between the second graphene sheet and the plurality of graphene sheets forming multiple layers. When used as an anode in a battery application, for example, the multiple layers may include a thickness from about 0.25 mm to 1.25 mm. In some examples, the multiple layers may include a thickness of at least, greater than, less than, equal to, or any number in between about 0.10 mm, 0.15 mm, 0.20 mm, 0.25 mm, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, 1.0 mm, 1.5 mm, 2.0 mm, 2.5 mm, 3.0 mm, 3.5 mm, 4.0 mm, 4.5 mm to 5.0 mm. In other examples, the material may be constructed and arranged as a component of body armor, a heat sink, an electrical conductor, or a structural building system material. When higher mechanical propensities are desired, additional layers of the composite are built up.

In another aspect, a method of forming a composite material is disclosed herein. The method may include depositing a plurality of fullerenes onto a graphene sheet, placing a subsequent graphene sheet on top of the plurality of fullerenes, and applying laser radiation to fuse the plurality of fullerenes to each graphene sheet, and morphing or transforming the fullerenes into carbon nanotubes. In other examples, the method may also include forming multiple layers of the graphene sheets with the plurality of fullerenes fused between each graphene sheet. For achieving the equivalent structural propensity of ASTM A36 steel, the multiple layers may include a thickness from about 0.45 mm to 0.60 mm. In some examples, the multiple layers may include a thickness of at least, greater than, less than, equal to, or any number in between about 0.30 mm, 0.31 mm, 0.32 mm, 0.33 mm, 0.34 mm, 0.35 mm, 0.36 mm, 0.37 mm, 0.38 mm, 0.39 mm, 0.40 mm, 0.41 mm, 0.42 mm, 0.43 mm, 0.44 mm, 0.45 mm, 0.46 mm, 0.47 mm, 0.48 mm, 0.49 mm, 0.50 mm, 0.51 mm, 0.52 mm, 0.53 mm, 0.54 mm, 0.55 mm, 0.56 mm, 0.57 mm, 0.58 mm, 0.59 mm, 0.60 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.78 mm, 0.79 mm, 0.80 mm, 0.81 mm, 0.82 mm, 0.83 mm, 0.84 mm, 0.85 mm, 0.86 mm, 0.87 mm, 0.88 mm, 0.89 mm, 0.90 mm, 0.91 mm, 0.92 mm, 0.93 mm, 0.94 mm to 0.95 mm. In other examples, the method may also include positioning the graphene sheets and the plurality of fullerenes together using one or more nanorollers that are configured to determine a spacing of the plurality of fullerenes onto the graphene sheets. In one example, the fullerenes are positioned onto the graphene sheets with a spacing from about 0.5 nm to about 2 nm from each other. In another example, the fullerenes may be deposited onto the graphene sheets with a spacing of at least 0.5 nm from each other. In some examples, the fullerenes may be positioned on the graphene sheets in a staggered pattern. In other examples, the fullerenes may be positioned on the graphene sheets in a uniform pattern. In another example, the fullerenes may have a diameter of at least 0.70 nm.

In still other aspects, a system for making a composite material is disclosed herein that may include at least one nanoroller configured to deposit or position a plurality of fullerenes onto a graphene sheet with a fullerene spacing of 0.5 nm to 2.0 nm from each other. In some examples, the nanoroller(s) may be configured to place a subsequent graphene sheet on top of the plurality of fullerenes. In other examples, the nanoroller(s) may be configured to form multiple layers of graphene sheets with fullerenes positioned between the graphene sheets. In another example, the system may include a laser that may be configured to fuse the plurality of fullerenes to each graphene sheet. In still another example, the fullerenes may morph or transform into carbon nanotubes that may have a diameter of at least 0.70 nm.

These and additional features will be appreciated with the benefit of the disclosures discussed in further detail below.

BRIEF DESCRIPTION OF THE DRAWINGS

A more complete understanding of features described herein and advantages thereof may be acquired by referring to the following description in consideration of the accompanying drawings, in which like reference numbers indicate like features.

FIG. 13 depicts the results summary comparing performance of a conventional steel flange to the performance of a composite material flange as disclosed herein.

FIGS. 14A-14C depict performance comparison of a conventional steel I-Beam to the performance of a composite material I-Beam as disclosed herein.

FIGS. 15A-15B depict materials and performance comparison of a conventional steel pressure vessel to the performance of a composite material pressure vessel as disclosed herein.

DETAILED DESCRIPTION

Figure 1:
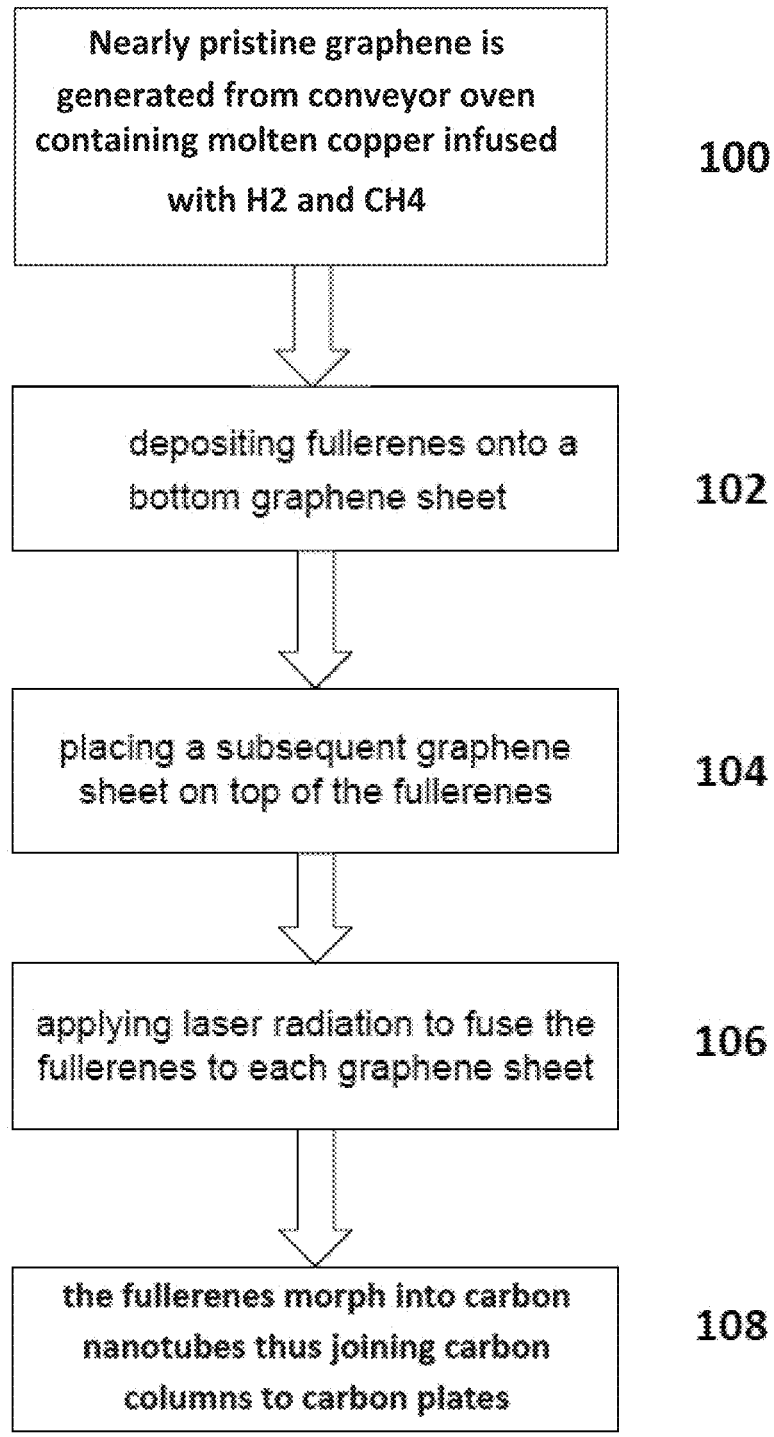
FIG. 1 depicts a workflow diagram for a method of forming a composite material in accordance with one or more embodiments of the disclosure described herein.

In the following description of the various embodiments, reference is made to the accompanying drawings identified above and which form a part hereof, and in which is shown by way of illustration various embodiments in which features described herein may be practiced. It is to be understood that other embodiments may be utilized and structural and functional modifications may be made without departing from the scope described herein. Various features are capable of other embodiments and of being practiced or being carried out in various different ways.

The novel material disclosed herein may be comprised of graphene plates or sheets and columnar-carbon pillars (i.e., carbon nanotubes). This material exhibits mechanical propensities and characteristics that supersede that of any comparable material to the industries in which it is applied. For example, as used within a structural building system, it far surpasses steel, steel-reinforced concrete, or any other conventional structural composite for structural purposes. Also, when used in an electrical application, the composite material disclosed herein displays superiority because of its thermoconductivity properties being about twice that of diamond whilst it has a capacitance twice that of graphene. Its energy absorption, when used as body armor, is eighteen times that of Kevlar®. The mechanical properties of this material may also be tuned by changing the quantity of layers (i.e., thickness) and the spacing distance between carbon columns.

Graphene and carbon nanotubes inherently possess tremendous structural qualities. In addition, both are non-corrosive and exhibit semi-conductive properties. Combining these different forms of carbon together in alternating layers allows for continuation of strength and conductivity. The tensile properties of graphene and fullerenes are over 200 times greater than that of steel whilst being 15% or less dense than steel.

Graphene has a tensile strength of about 130 GPa and a Young's modulus of about 1 TPa—150,000,000 psi. Graphene is also be an excellent conductor of heat at room temperature (e.g., at $(4.84\pm0.44)\times10^3$ to $(5.30\pm0.48)\times10^3$ $W\cdot m^{-1}\cdot K^{-1}$) and also an excellent conductor of electricity with known electron mobility values of more than about 200,000 $cm^2\cdot V^{-1}\cdot s^{-1}$). Graphene is also the thinnest compound known to man at one atom thick, and the lightest material known (with 1 square meter weighing around 0.77 milligrams), the strongest compound discovered (between 100-300 times stronger than steel with a tensile strength of 130 GPa and a Young's modulus of about 1 TPa—150,000, 000 psi). As such, the new composite disclosed herein may be orders of magnitude lighter and may require less material than its equivalent steel, concrete, or composite equals.

The present inventors have confirmed using Large-scale Atomic/Molecular Massively Parallel Simulator (LAMMPS) analysis performed on this new material that an ideal spacing of columns at intervals of about 0.5 to 2 nm and indirectly staggered via optimal patterning, layer by layer, may provide ideal mechanical performance, although in some embodiments other intervals and/or spacings may be used in one or more layers and still result in beneficial mechanical performance. Various LAMMPS and finite elemental analyses (FEA) have been conducted and are described below. Surprisingly, the composite material disclosed herein has exhibited superior quality and performance compared to current industry standard materials.

The composite disclosed herein may include pristine graphene and fullerenes (i.e., carbon nanotubes). "Pristine graphene" may refer to defect free graphene or nearly defect free graphene and may be used interchangeably herein with "graphene." These materials may be formed together using novel nanorollers that may determine the spacing of fullerenes onto the pristine graphene sheets. The rollers disclosed herein allow for the specific placement and arrangement of nanoparticles (e.g., fullerenes) onto a solid substrate (e.g., a graphene sheet). The built-up layering of composites created with this device allows for the mechanical tunability of the specimen material. By varying the thickness of the layering, and the distance between fullerenes, the properties of the composite material are altered to meet use requirements. The nano-precision of the roller is unlike any in existence today. Some of the nanoparticles that can be precisely placed onto the roller include fullerenes and Buckyminsterfullerenes or "Buckyballs" (i.e., C60 fullerenes), which are spherical forms of carbon that vary in diameter. The nanorolling press, with a fullerene and nanoparticle feedstock hopper, may be manufactured to accommodate specific diameter nanoparticles. For example, Buckyballs (C60 fullerenes) can be rolled by creating indentations that have radii slightly greater than about 0.7 nm in diameter which is slightly larger than the diameter of a Buckyball. In some examples, the diameter may be a range from about 0.7-0.95 nm. In other examples, the diameter may be at least, greater than, less than, equal to, or any number in between about 0.70 nm, 0.71 nm, 0.72 nm, 0.73 nm, 0.74 nm, 0.75 nm, 0.76 nm, 0.77 nm, 0.78 nm, 0.79 nm, 0.80 nm, 0.81 nm, 0.82 nm, 0.83 nm, 0.84 nm, 0.85 nm, 0.86 nm, 0.87 nm, 0.88 nm, 0.89 nm, 0.90 nm, 0.91 nm, 0.92 nm, 0.93 nm, 0.94 nm and 0.95 nm. The ability to control spacing of the fullerenes on a substrate is important in order to fabricate and synthesize materials requiring nano-scale precision without material degradation that occurs during a chemical etching process.

FIG. 1 depicts a workflow diagram for a method of forming a composite material using one or more nanorollers described herein. One, some, or all steps of the example method of FIG. 1 may be performed by a controller. Also or alternatively, one, some, or all steps of the example method of FIG. 1 may be performed by one or more other computing devices. One or more steps of the example method of FIG. 1, may be rearranged (e.g., performed), omitted, and/or otherwise modified, and/or other steps added.

At step 100, the single atom thick pristine graphene layers that may comprise the ply-by-ply built up nanocomposite disclosed herein, which are processed by the nanorolling press (nanoroller), may be generated via conveyor oven that grows single-layer pristine graphene via liquidphase copper that passes through the oven. See *Graphene Grown on Liquid Copper Surface*, Dechao Geng, Bin Wu, Yunlong Guo, Liping Huang, Yunzhou Xue, Jianyi Chen, Gui Yu, Lang Jiang, Wenping Hu, Yunqi Liu Proceedings of the National Academy of Sciences May 2012, 109 (21) 7992-7996; DOI: 10.1073/pnas.1200339109, incorporated herein by reference in its entirety for all purposes. The liquid copper traveling through the oven may be exposed to a gas mixture that may be some part methane and some part hydrogen. The liquidphase copper may be exposed to this gas mixture for a predetermined time period that allows for the single layer growth of pristine graphene. Upon reaching the end of its conveyance, the single layer graphene may be vibrated at a set frequency whereby the graphene separates intact from the solid copper substrate and may be gathered into rolls that can then be fed into the nanorolling press for composite build-up.

At step 102, fullerenes may be deposited on to a bottom graphene sheet. In some configurations, the nanoroller(s) may include indentations configured to position fullerenes on a substrate in a specific pattern and spacing interval. The fullerenes may be positioned in a uniform or nonuniform pattern. In other examples, the fullerenes may be positioned in a staggered manner, or positioned in a linear and matched fashion. In other examples, the fullerenes may be positioned with a set spacing between the fullerenes. For purposes of maximizing the mechanical performance of the composite herein, the optimal spacing arrangement of indentations on the roller of the nanorolling press utilized for fullerene (e.g., Buckyball) placement on a graphene sheet substrate may be about 0.5 to 2.0 nm between individual fullerenes. In other examples, the spacing between fullerenes may be, for example, at least, greater than, less than, equal to, or any number in between about 0.1 nm, 0.2 nm, 0.3 nm, 0.4 nm, 0.5 nm, 0.6 nm, 0.7 nm, 0.8 nm, 0.9 nm, 1.0 nm, 1.5 nm, 2.0 nm, 2.5 nm, 3.0 nm, 3.5 nm, 4.0 nm, 4.5 nm, 5.0 nm, 5.5 nm, 6.0 nm, 6.5 nm, 7.0 nm, 7.5 nm, 8.0 nm, 8.5 nm, 9.0 nm, 9.5 nm, and 10.0 nm.

At step 104 a subsequent graphene sheet may be placed on top of the fullerenes positioned by the nanoroller(s) in step 102. Steps 102 and 104 may be repeated as required to reach a particular thickness desired thus achieving a specifically desired mechanical property.

Figure 2:
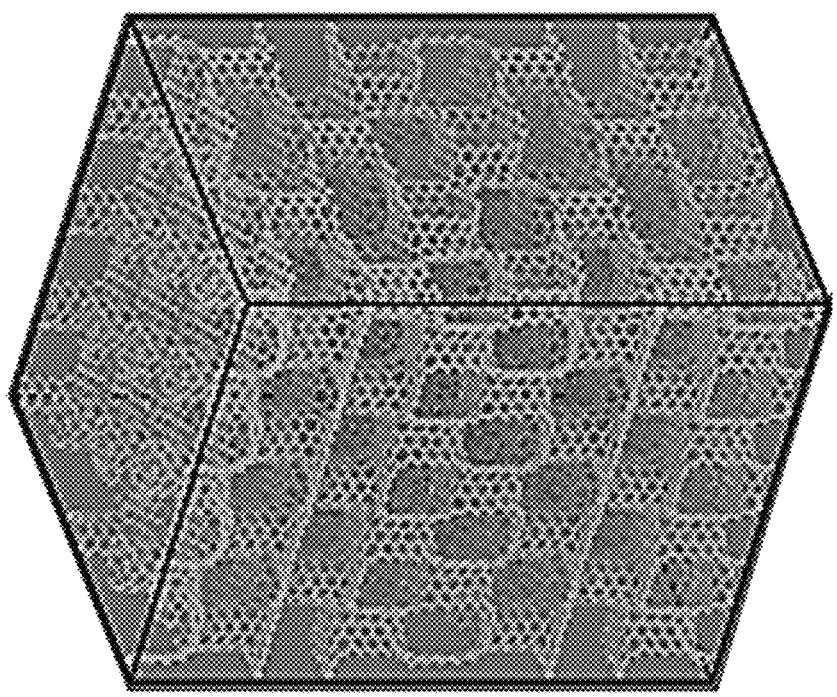
FIG. 2 illustrates a composite material comprising carbon nanotubes positioned and fused between layered graphene sheets.

At step 106, laser radiation emitted through a titanium sapphire laser generating femtosecond pulses at a frequency between 450 and 700 nm or plasma energy (i.e., heat), or any other heat generating source may be applied to fuse the fullerenes to each graphene sheet or other substrate. In some examples, the frequency may be approximately 532 nm. Application of heat or plasma fuses the assembly structure into a single structure as shown in FIG. 2.

At step 108, the fullerenes are transformed or morph into carbon nanotubes. The particular spacing array of fullerenes, when built-up ply-by-ply using a staggered honeycomb or other pattern, for example and in accordance with the method described in FIG. 1, may result in the formation of the one of the strongest composite materials in the world—Graphul™. Application of heat or plasma rearranges the carbon atoms in the graphene and C60 molecules to form a new, more energy favorable structure as depicted in FIG. 2 (i.e., carbon nanotubes).

The fullerene/nanoparticle feedstock may be replenished during its use in the manufacturing process outlined in FIG. 1. The fullerenes/nanoparticles are under a slight amount of pressure or force within the hopper to enable contact with the nanoroller's surface to facilitate depositing/positioning the fullerenes/nanoparticles into the indentations on the nanoroller. The bottom of the feedstock hopper may be adjacent to the nanoroller—the nanoroller may be further described as a nano-etched surface on a rotating rod. The roller may rotate with use of frictionless gears thereby eliminating contaminates or other foreign bodies from being deposited onto the substrate that the fullerenes are being rolled onto and applied. In other examples, an electrical charge may be applied to the substrate material in order to firmly affix nanoparticles onto substrate. The charging step may take place prior to having additional substrate sheets layered on top of the fullerenes and then joined/fused via radiation.

The system and method of making a composite material disclosed herein enables nanoparticles to be applied to a substrate in a precise and predetermined manner. Currently, the best-known method of placing fullerenes is the use of tether molecules whereby the chemical chains connected to fullerenes act as spacers. In order to remove those spacer chain molecules after proper fullerene placement, the composite must be radiated or undergo a chemical process. This process can do irreparable harm to the desired composite. By utilizing the nanorolling press with a fullerene and nanoparticle feedstock hopper, the composite's structural and chemical integrity is assured. Specific placement of fullerenes, as dictated by the indentation pattern of the nanorolling press roller surface provides for the structural tuning of the composite material. As described above, to create a composite with greater structural properties, the nanoroller's nanoindentations that collect fullerenes may be spaced at about 0.5 to 2.0 nm. Such a spacing of fullerenes, applied by the nanoroller onto the pristine graphene, will create carbon nanocolumns of support within the composite. The composite materials disclosed herein may be used as structural materials that require the tuning or placement of fullerenes in order to determine their structural qualities or capacities. Two main factors allow for the tunability of the composite material's inherent structural capacities to include 1) thickness; and 2) spacing and location of fullerenes/carbon nanotubes. For achieving the equivalent structural propensity of ASTM A36 steel, the multiple layers may include a thickness from about 0.45 mm to 0.60 mm. When the composite herein is used as an anode in a battery application, the multiple layers may include a thickness from about 0.25 mm to 1.25 mm. The nanorolling press system is critical to the fabrication of the composite material disclosed herein—Graphul™.

As previously explained, once the fullerenes have been deposited onto a bottom graphene sheet, another subsequent sheet of graphene may then placed on top of the fullerenes and laser or plasma energy may be used to fuse the fullerenes to each respective graphene sheet, and to transform the fullerenes into carbon nanotubes. This process is repeated with the nanorollers applying fullerenes to the top of the already joined portion of material until the desired thickness is achieved. In an alternative example, the substrate layers and fullerenes are positioned or layered in their entirety and then laser or plasma energy is applied to create a fully joined composite.

EXAMPLES

Thermo-Conductivity Testing.

Figure 3A:
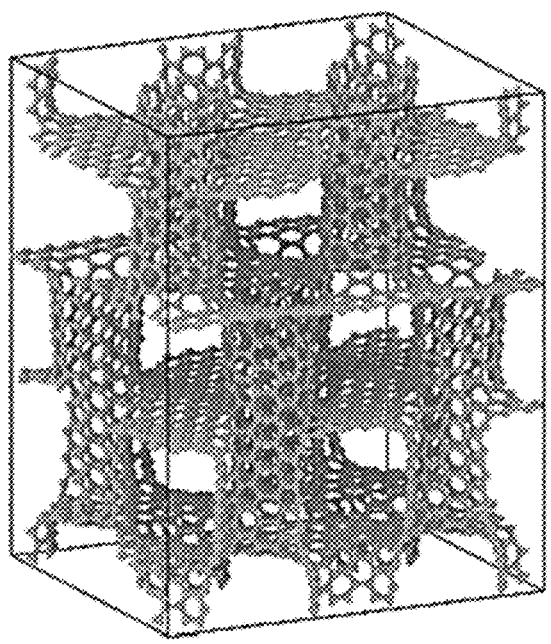
FIGS. 3A-3D illustrate the thermo-conductivity of the composite material in the direction of the carbon nanotubes disclosed herein to include conformation of the graphene layer for thermo-conductivity calculations, solid spherical ball model from the target graphene layer, temperature distribution, and heat flux distribution.
Figure 3B:
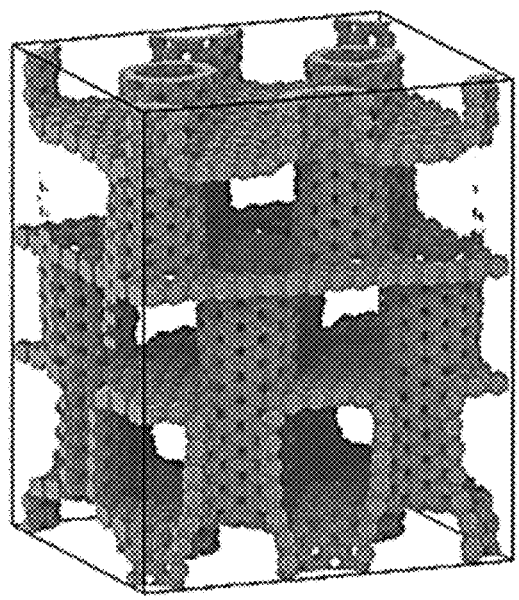
Figure 3C:
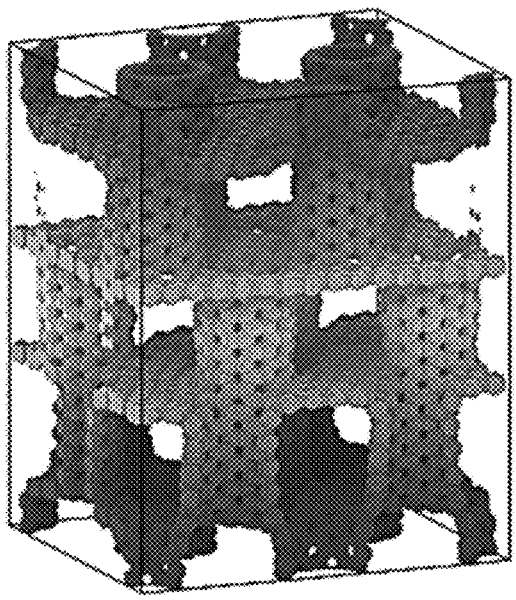
Figure 3D:
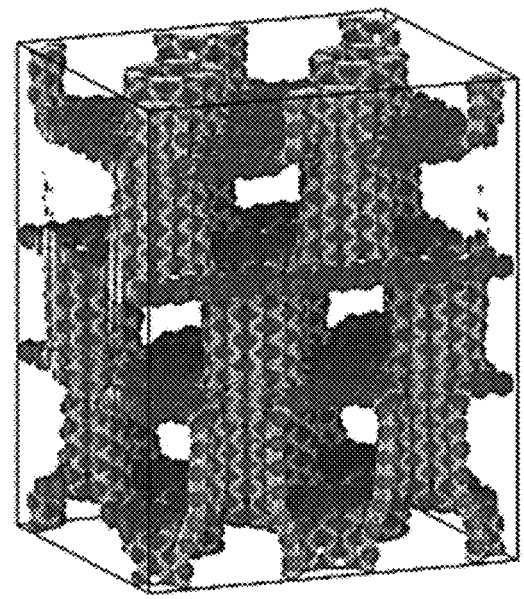

To measure thermo-conductivity of the composite material, a target sample material was placed between two terminals which were located at a top and a bottom boundary in z direction respectively. The two terminals had a constant temperature difference of 1° K. The bottom terminal had T=0° K as the low temperature end and the top terminal had T=1° K as the high temperature end. Thermo-conductivity was measured along the carbon nanotube direction. From heat flux distribution shown in FIGS. 3C and 3D, it was determined that the carbon nanotubes contributed most of the temperature and heat conduction. By integrating the heat flux across the system, total thermo-resistance was calculated: $R=8.873446\times10^{-5}$ K/W of the sample material. Macroscopic thermo-conductivity was calculated by normalizing the sample geometry:

$$K = \frac{L}{AR} = \frac{44\text{Å}}{117.379031\text{Å}^2 \times 3.541775 \times 10^{-5} \frac{K}{W}} = 4220 \text{ W/mK}$$

Figure 4A:
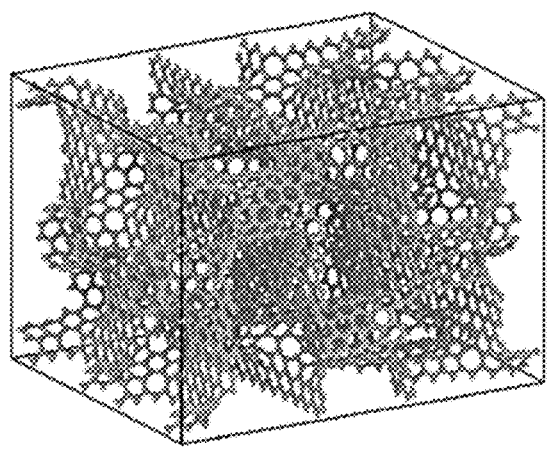
FIGS. 4A-4D illustrate the thermo-conductivity of the composite material in the direction of the graphene sheets disclosed herein to include conformation of the graphene layer for thermo-conductivity calculations, solid spherical ball model from the target graphene layer, temperature distribution, and heat flux distribution.
Figure 4B:
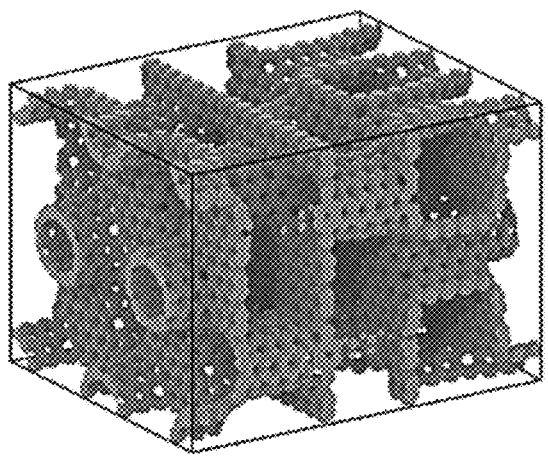
Figure 4C:
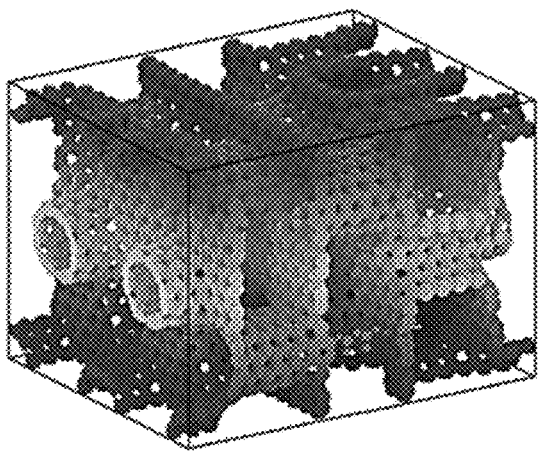
Figure 4D:
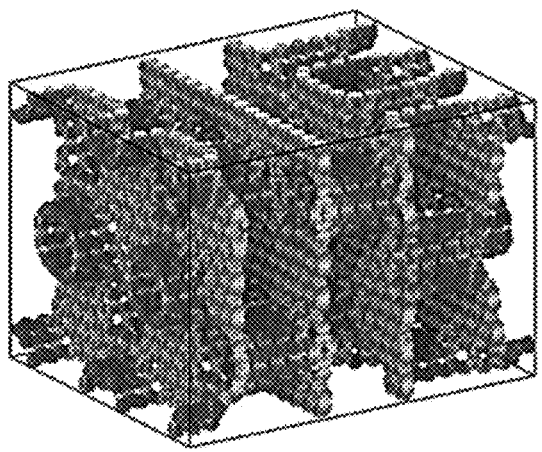

Thermo-conductivity measurement was then calculated along the graphene layer direction by flipping the material conformation by 90 degrees. As shown in FIGS. 4A-4B, both of the graphene layers and portions of the carbon nanotubes contribute the heat conduction, so the conductivity was expected to be higher than in the carbon nanotube direction. The thermo-resistance was measured as: $R=3.541775\times10^{-5}$ K/W and the thermo-conductivity of the material along the graphene layer direction was:

$$K = \frac{L}{AR} = \frac{35.04\text{Å}}{187.27\text{Å}^2 \times 3.541775 \times 10^{-5} \frac{K}{W}} = 5280 \text{ W/mK}$$

TABLE 1

Summary of Thermo-Conductivity.

| SYSTEM | THERMO-CONDUCTVITY K (W/mK) |
|---|---|
| Graphene Single Layer | 5005 |
| G/CNT: Graphene Layer Direction | 5280 |
| G/CNT: CNT Direction | 4220 |

The thermo-conductivity of a material is determined by atomistic structure as well as its atom arrangement. Graphene has a relatively high thermo-conductivity, which is determined by the closer carbon-carbon distance ($sp^2$ state), where electrons are able to transfer faster due to a larger electron cloud overlapping compared to a carbon-carbon bond in a diamond which has a longer carbon-carbon distance ($sp^3$ state). The graphene-carbon nanotube materials disclosed herein not only preserved the short carbon-carbon bond length of graphene, but also provided additional pathways for heat to dissipate due to the network structure of the materials.

Tensile Strength Testing.

Tensile testing was conducted for four different target systems: composite with carbon nanotube single spacing and double spacing, and two pulling directions (graphene direction and carbon nanotube direction). System setup is shown below in Table 2.

TABLE 2

System Overview of the Tensile Test.

| Sample | Pulling direction | Dim. x (Å) | Dim. y (Å) | Dim. z (Å) |
|---|---|---|---|---|
| CNT single spacing | graphene direction x | 34.79629 | 40.18574 | 49.64892 |
| CNT single spacing | CNT direction z | 34.79629 | 40.18574 | 49.64892 |
| CNT double spacing | graphene direction x | 69.02614 | 79.65739 | 60.76484 |
| CNT double spacing | CNT direction z | 69.02614 | 79.65739 | 60.76484 |

Figure 5:
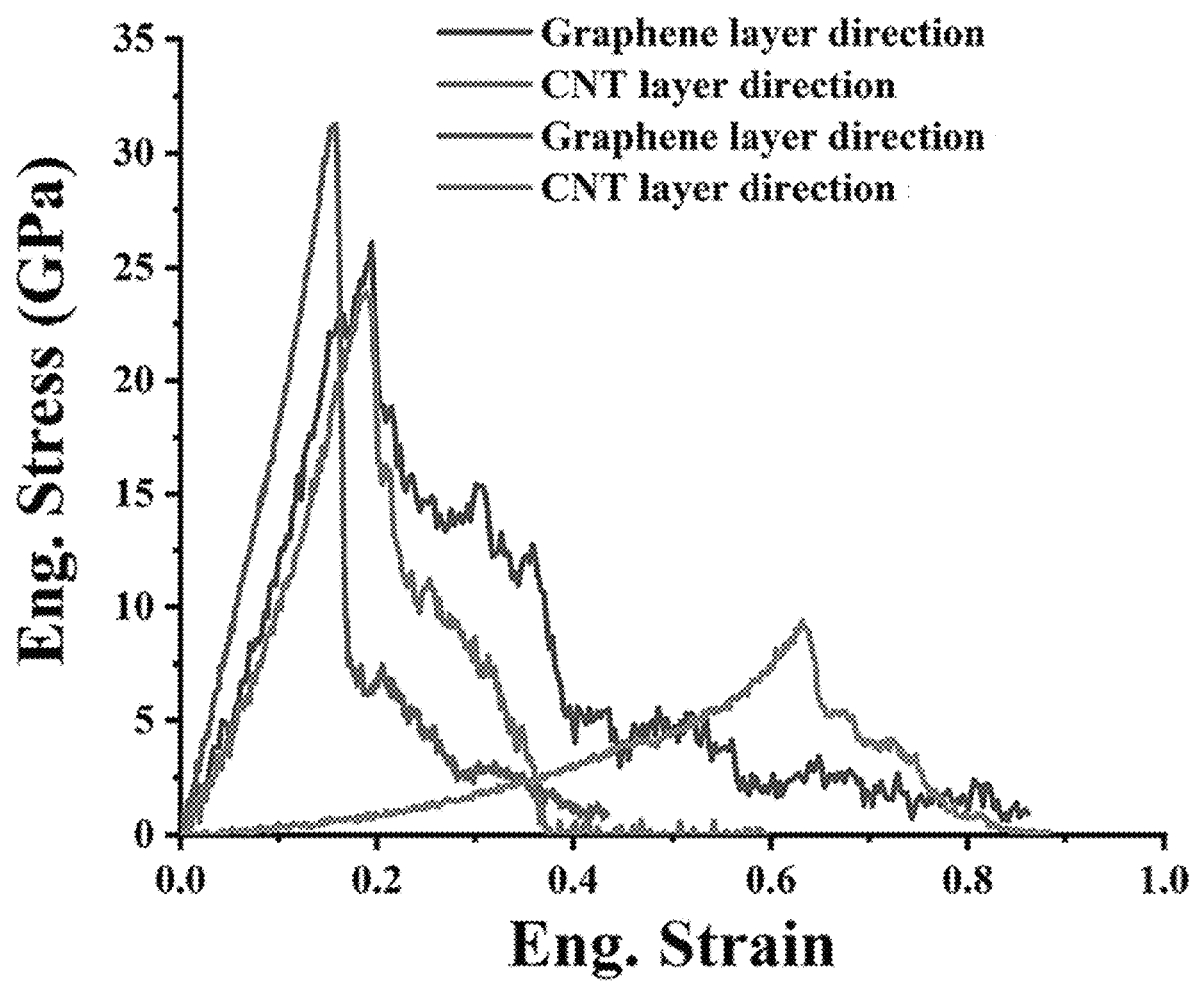
FIG. 5 graphically depicts the stress-strain curve for the composite material disclosed herein.

Varying the space between carbon nanotubes changes the density of the material. In some examples, the space between carbon nanotubes may be at least, greater than, less than, equal to, or any number in between about 0.50 nm, 0.51 nm, 0.52 nm, 0.53 nm, 0.54 nm, 0.55 nm, 0.56 nm, 0.57 nm, 0.58 nm, 0.59 nm, 0.60 nm, 0.61 nm, 0.62 nm, 0.63 nm, 0.64 nm, 0.65 nm, 0.66 nm, 0.67 nm, 0.68 nm, 0.69 nm, 0.70 nm, 0.71 nm, 0.72 nm, 0.73 nm, 0.74 nm, 0.75 nm, 0.76 nm, 0.77 nm, 0.78 nm, 0.79 nm, 0.80 nm, 0.81 nm, 0.82 nm, 0.83 nm, 0.84 nm, 0.85 nm, 0.86 nm, 0.87 nm, 0.88 nm, 0.89 nm, 0.90 nm, 0.91 nm, 0.92 nm, 0.93 nm, 0.94 nm, 0.95 nm, 0.96 nm, 0.97 nm, 0.98 nm, 0.99 nm, 1.00 nm, 1.10 nm, 1.11 nm, 1.12 nm, 1.13 nm, 1.14 nm, 1.15 nm, 1.16 nm, 1.17 nm, 1.18 nm, 1.19 nm, 1.20 nm, 1.21 nm, 1.22 nm, 1.23 nm, 1.24 nm, 1.25 nm, 1.26 nm, 1.27 nm, 1.28 nm, 1.29 nm, 1.30 nm, 1.31 nm, 1.32 nm, 1.33 nm, 1.34 nm, 1.35 nm, 1.36 nm, 1.37 nm, 1.38 nm, 1.39 nm, 1.40 nm, 1.41 nm, 1.42 nm, 1.43 nm, 1.44 nm, 1.45 nm, 1.46 nm, 1.47 nm, 1.48 nm, 1.49 nm, 1.50 nm, 1.51 nm, 1.52 nm, 1.53 nm, 1.54 nm, 1.55 nm, 1.56 nm, 1.57 nm, 1.58 nm, 1.59 nm, 1.60 nm, 1.61 nm, 1.62 nm, 1.63 nm, 1.64 nm, 1.65 nm, 1.66 nm, 1.67 nm, 1.68 nm, 1.69 nm, 1.70 nm, 1.71 nm, 1.72 nm, 1.73 nm, 1.74 nm, 1.75 nm, 1.76 nm, 1.77 nm, 1.78 nm, 1.79 nm, 1.80 nm, 1.81 nm, 1.82 nm, 1.83 nm, 1.84 nm, 1.85 nm, 1.86 nm, 1.87 nm, 1.88 nm, 1.89 nm, 1.90 nm, 1.91 nm, 1.92 nm, 1.93 nm, 1.94 nm, 1.95 nm, 1.96 nm, 1.97 nm, 1.98 nm, 1.99 nm, and 2.00 nm. For example, carbon nanotube single spacing: 0.86 g/cm3, carbon nanotube double spacing: 0.55 g/cm3. Tensile strength results depicted in FIG. 5 are shown below in Table 3. For carbon nanotube single spacing, pulling in two directions displayed similar stress-strain behavior, with similar modulus and ultimate strength. See FIG. 5. By increasing the carbon nanotube double spacing, however, an increase of both modulus and ultimate strength was displayed when pulling along graphene direction with a significant reduction in fracture strain as shown in FIG. 5. Pulling along the carbon nanotube direction, however, displayed a large decrease in both modulus and ultimate strength with a dramatic increase in the fracture strain. The overall results are summarized below in Table 3.

TABLE 3

Summary of the Tensile Test Results.

| Pulling direction | CNT spacing | Tensile strength | Young's modulus |
|---|---|---|---|
| Graphene Layer | single | 26.1 GPa | 129 GPa |
| CNT | single | 23.7 GPa | 84 GPa |
| Graphene Layer | double | 31.2 GPa | 183 GPa |
| CNT | double | 9.4 GPa | 6 GPa |

Figure 6A:
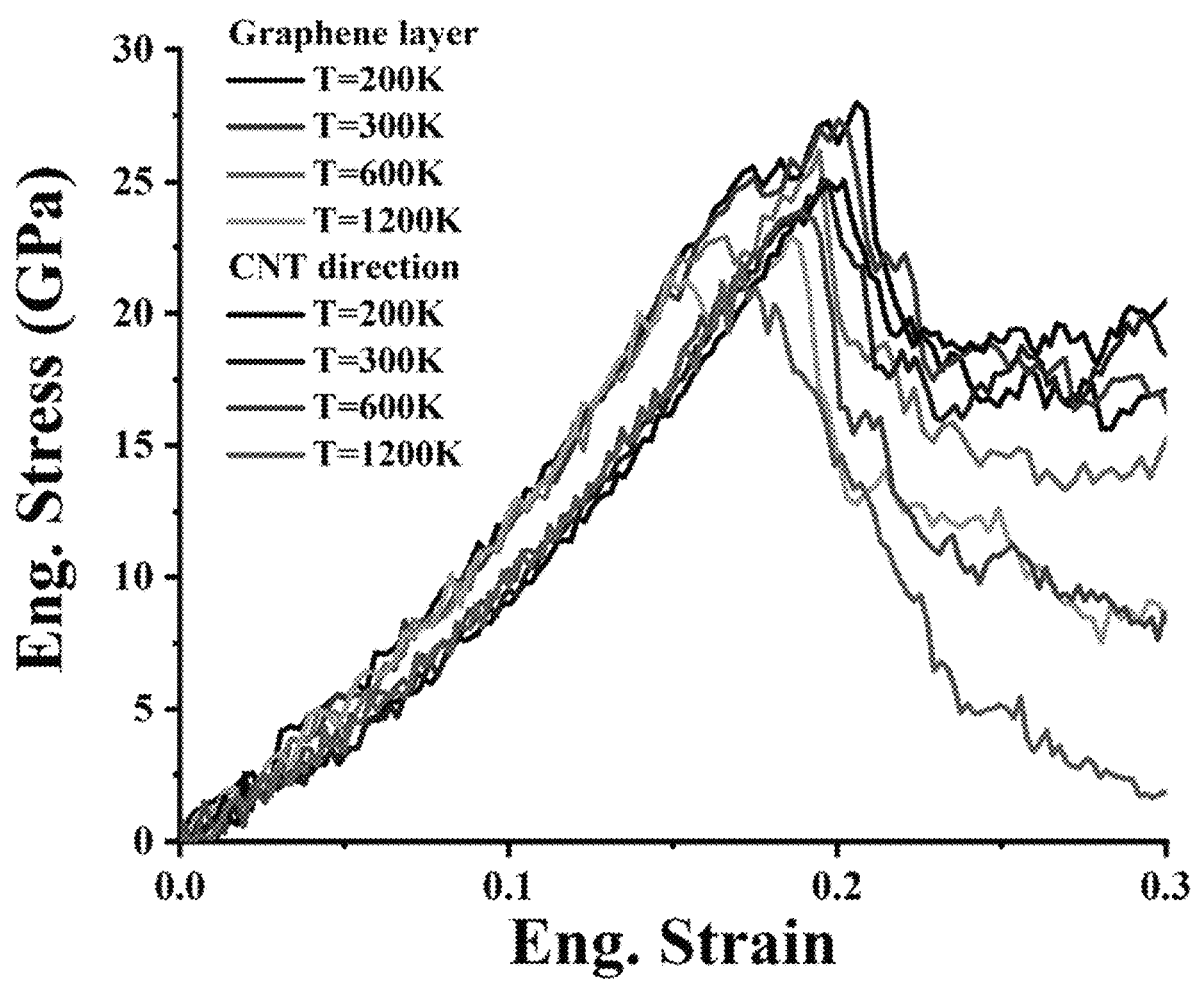
FIG. 6A-6B graphically depict temperature effect on the tensile test of the composite material.
Figure 6B:
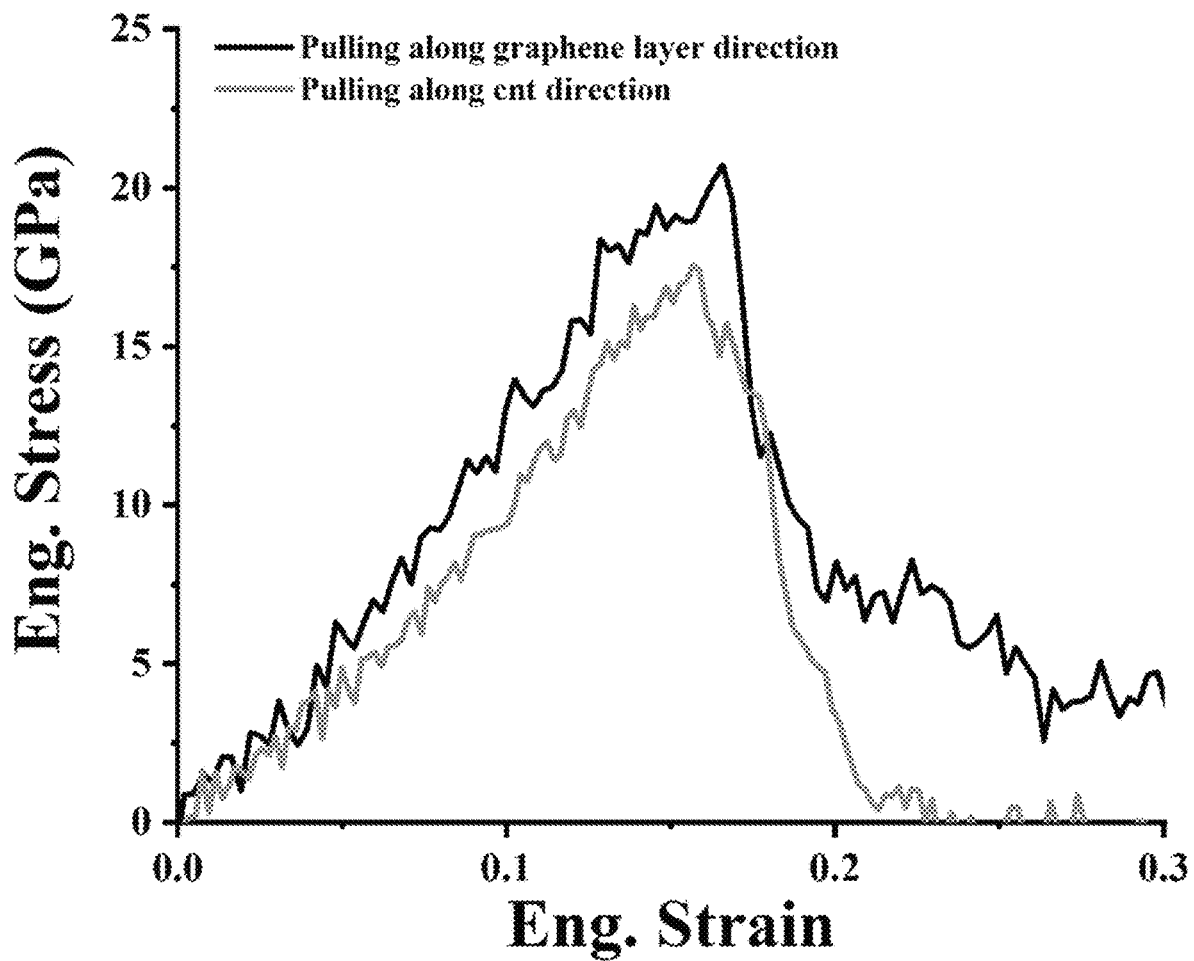

The composite material with carbon nanotube single spacing was also tested under different temperatures to include T=200° K, 300° K, 600° K and 1200° K as shown in FIG. 6A and a temperature of 1800° K as shown in FIG. 6B. The results indicate that as temperature increases, modulus of the composite material does not change significantly while ultimate strength decreases accordingly.

Compression Testing.

Figure 7:
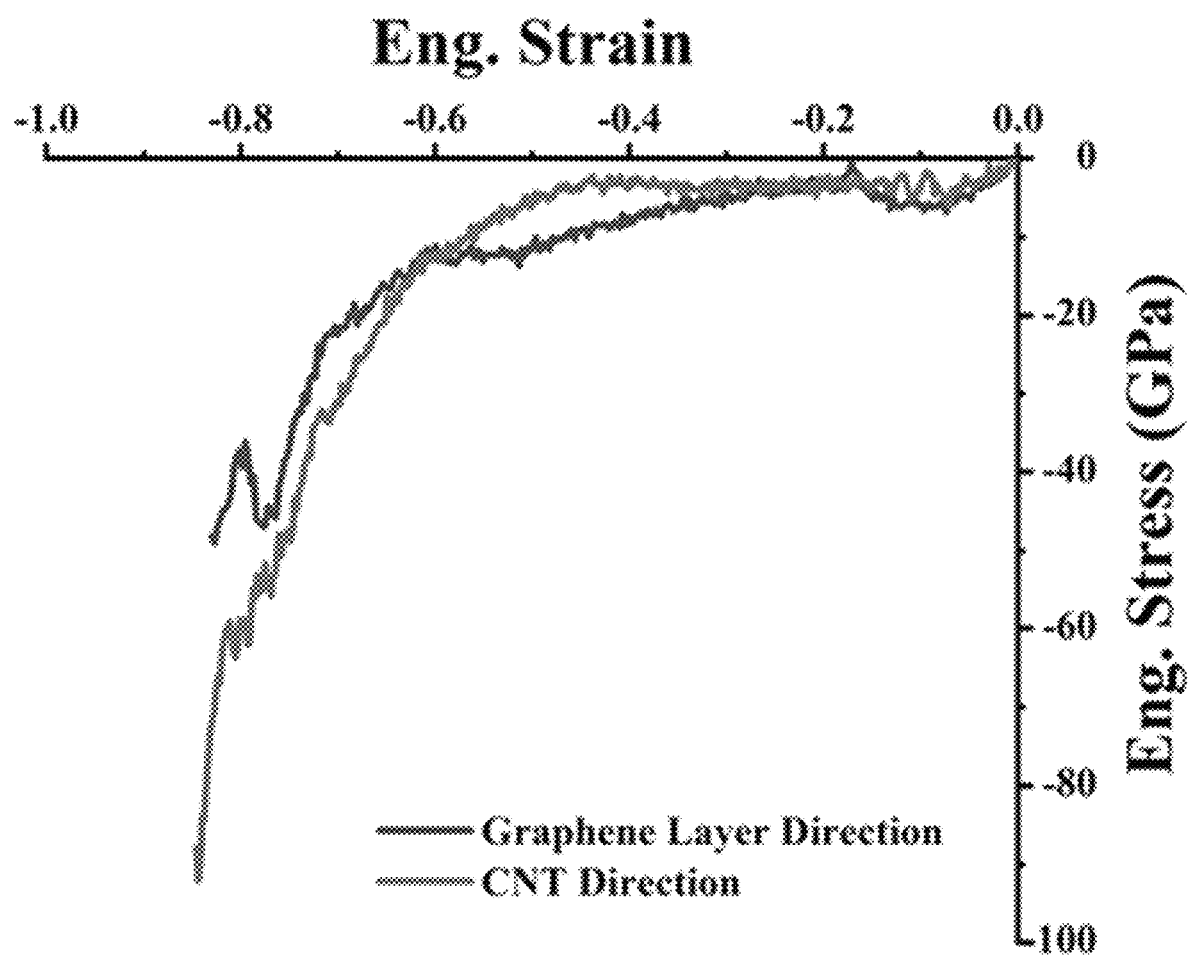
FIG. 7 graphically depicts the stress-strain curve of the composite material compression testing.

Compression test results are shown in FIG. 7 and include the composite material with carbon nanotube single spacing, and stress/strain for two directions: 1) graphene direction; and 2) carbon nanotube direction. As shown in FIG. 7, compression plateau is observed from the stress-strain curve. For both directions, a similar plateau is observed at a stress of about σ=5 GPa.

Fracture Testing.

Figure 8A:
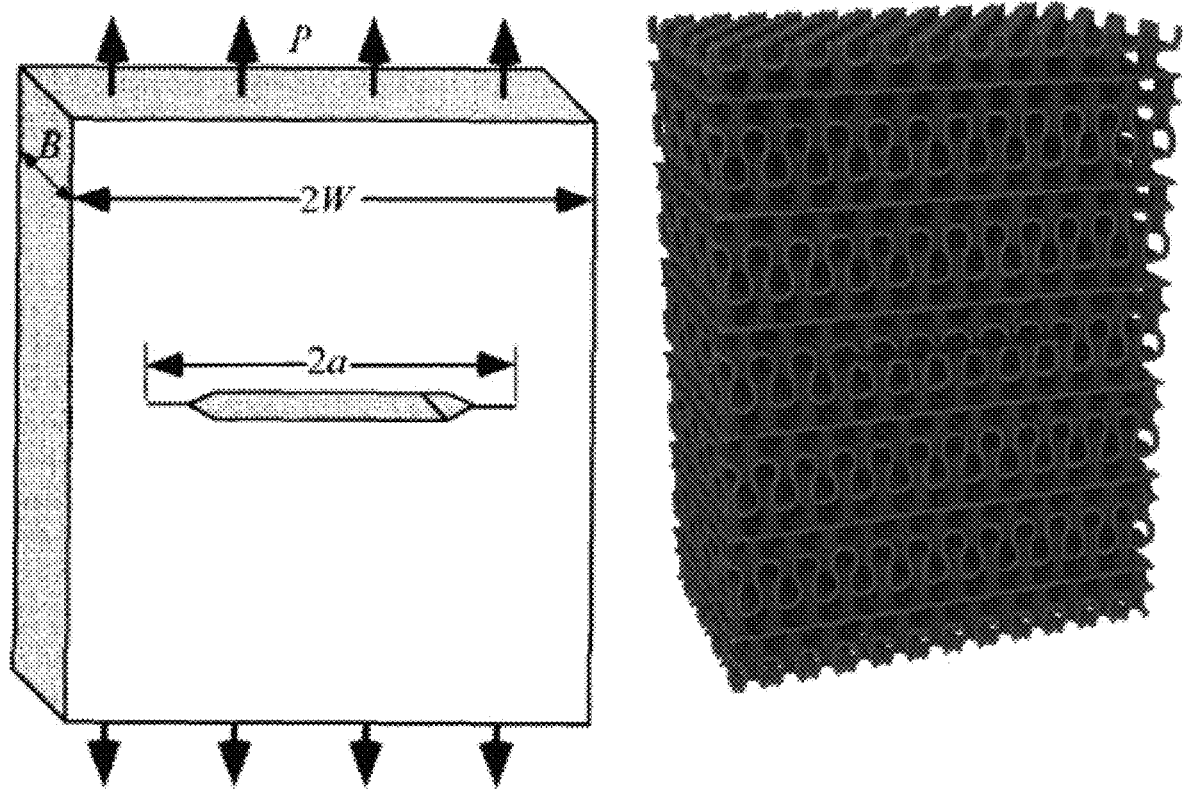
FIGS. 8A-8D illustrate fracture testing results along the graphene layer direction and the carbon nanotube direction.
Figure 8B:
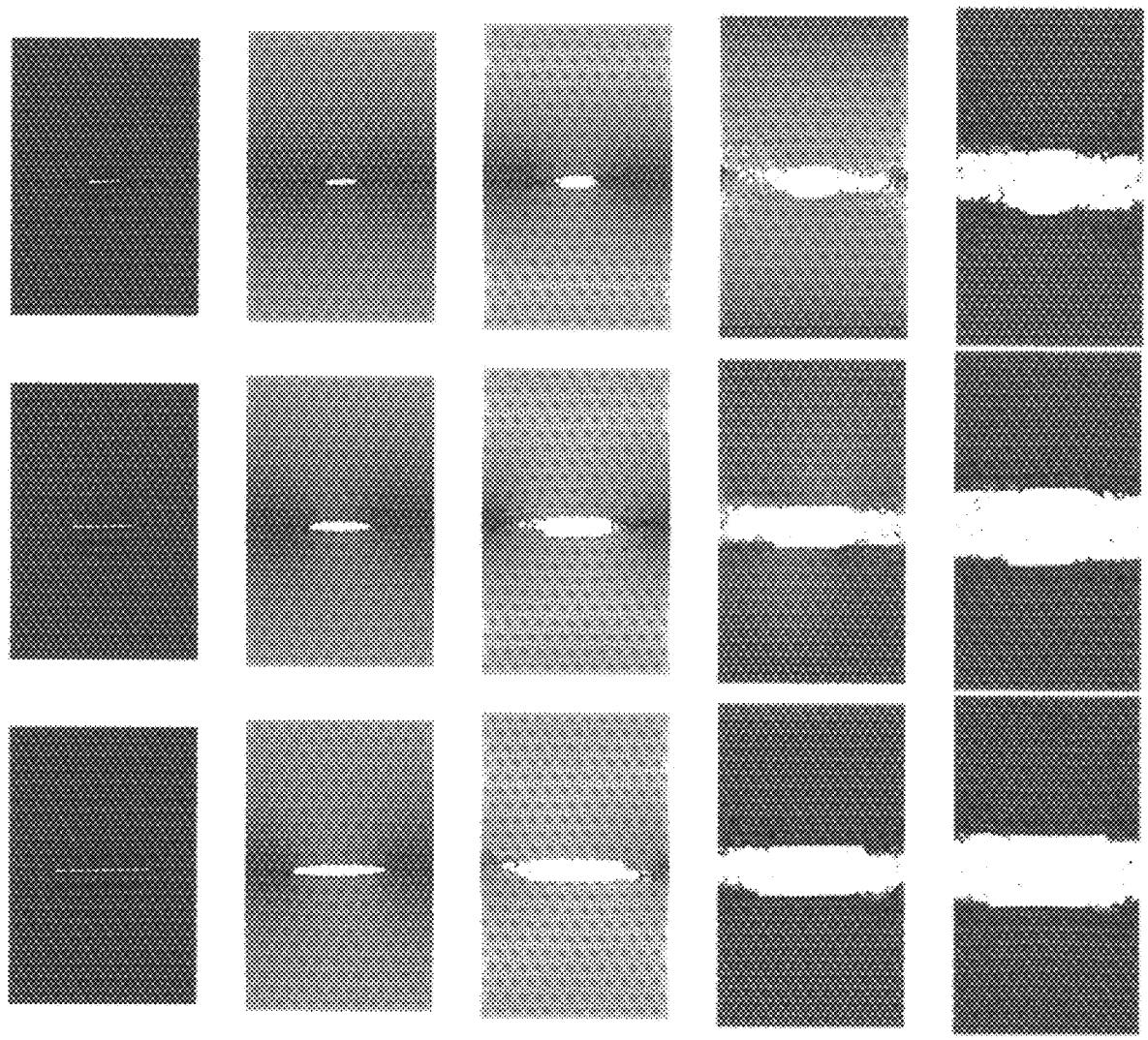
Figure 8C:
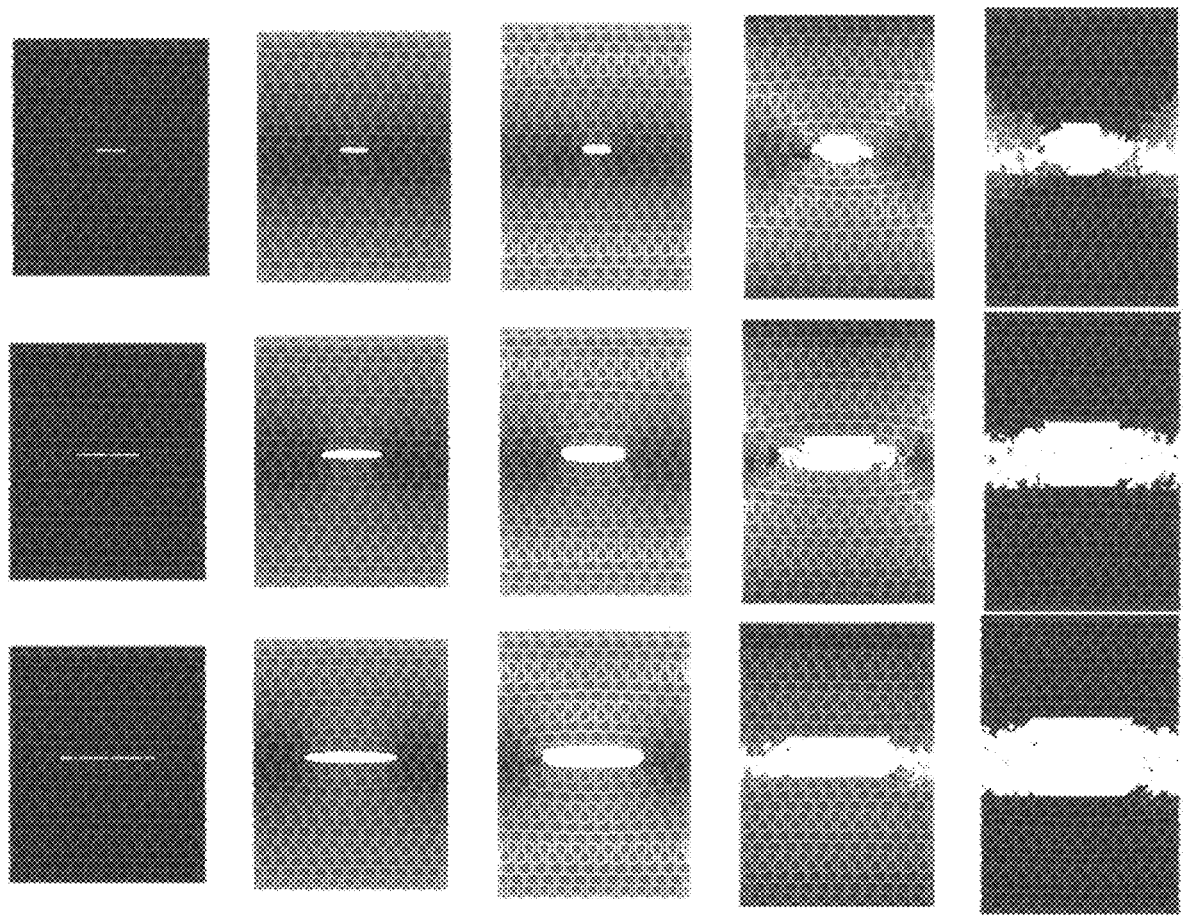
Figure 8D:
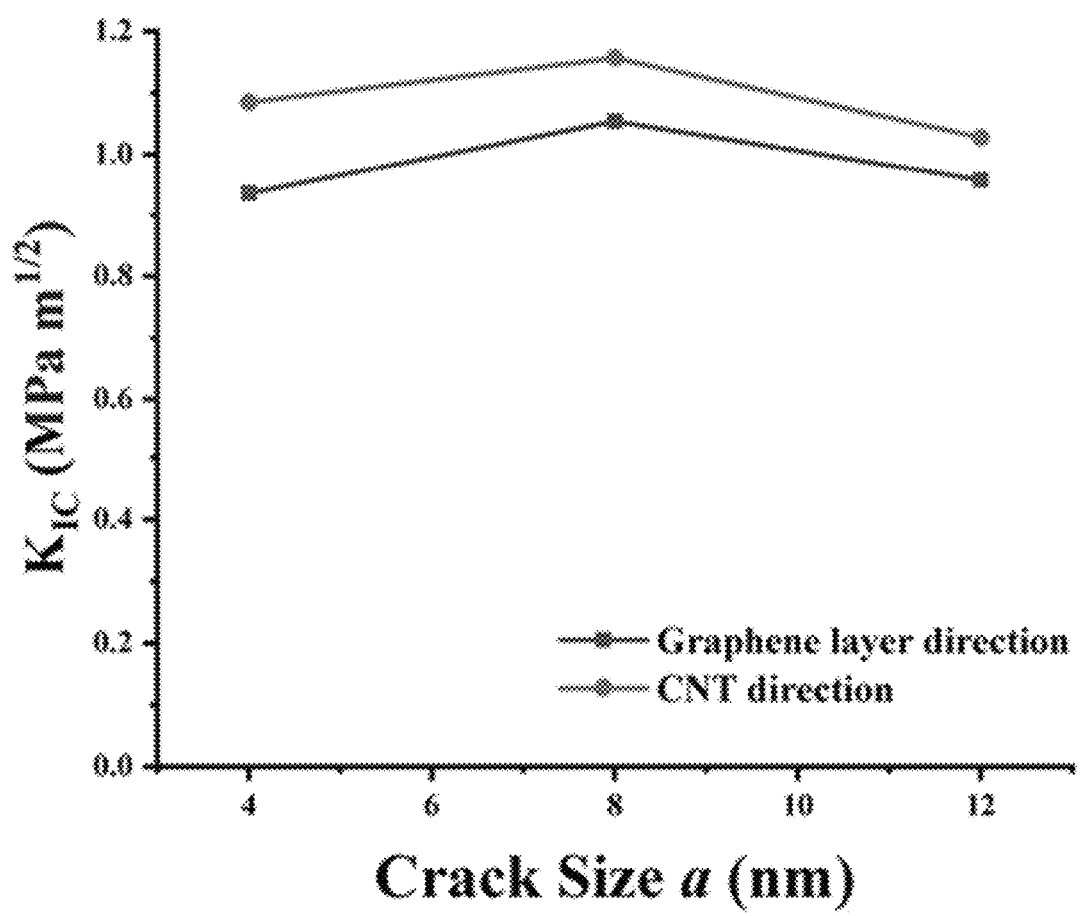

Fracture toughness (K) was used to describe the composite material's resistance to crack propagation. K was calculated using a middle crack type, with a tensile crack style as shown in FIG. 8A. Fracture toughness may be calculated from the critical stress and crack size:

$$K_{IC} = \sigma F \sqrt{\pi a}$$

Where σ is the true stress applied to the sample, F is geometric factor (depending on the crack geometry and location), and a describes the crack size. Here F=1. As shown in the snapshots of the fracture toughness test results of FIGS. 8B and 8C for pulling along the graphene layer and carbon nanotube direction respectively, a stronger resistance in crack propagation ability is observed along the carbon nanotube direction (see FIG. 8C). It was determined that fracture toughness does not depend on the crack size, indicating that—surprisingly—the fracture toughness is an intrinsic property of the composite material disclosed herein, determined purely by molecular structure. Further, as graphically depicted in FIG. 8D, carbon nanotube direction has a larger fracture toughness than the graphene direction.

Hardness Testing.

Figure 9A:
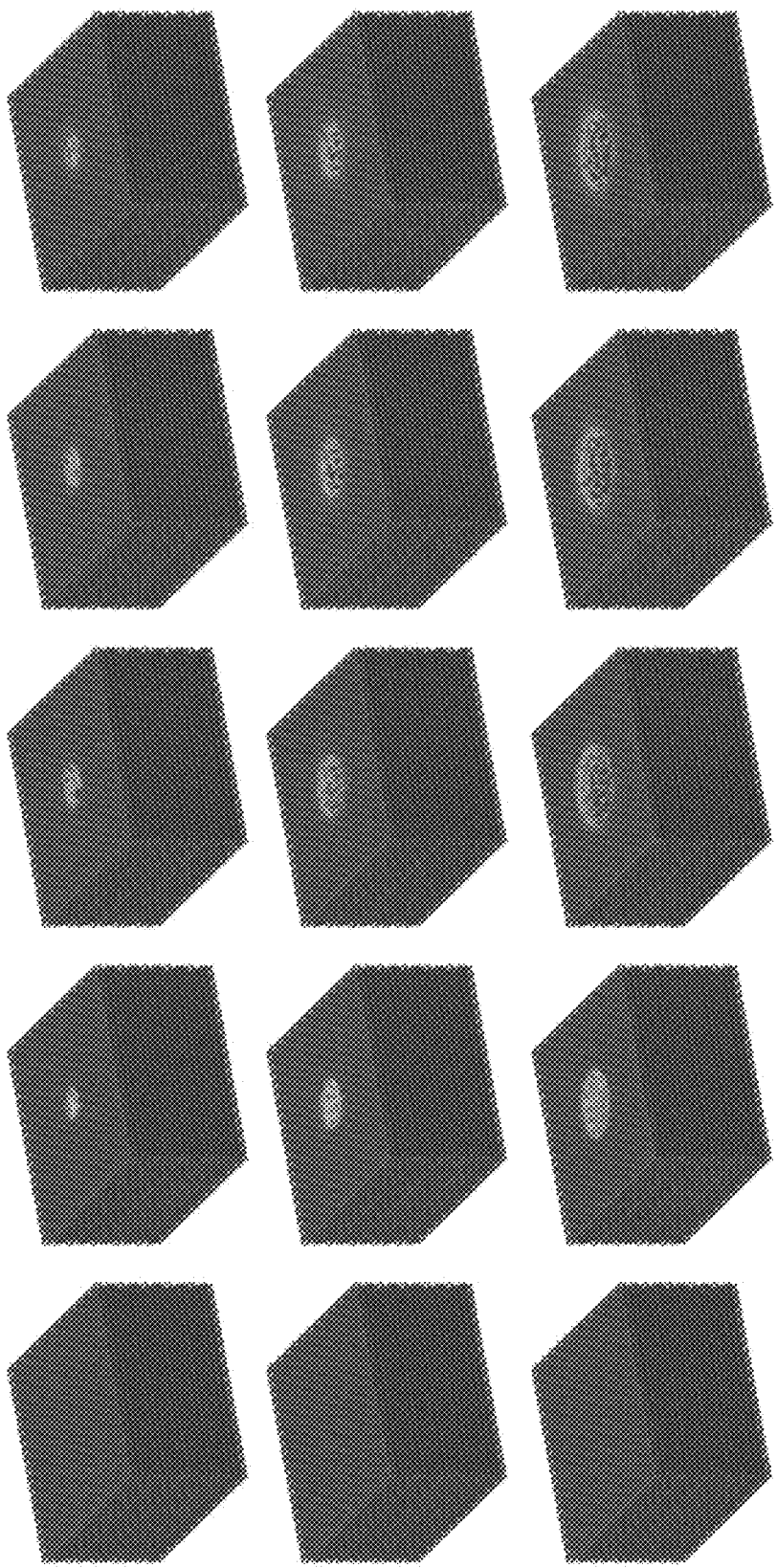
FIGS. 9A-9B illustrate hardness testing results by nano-indentation and depict hardness as a function of indentation depth.
Figure 9B:
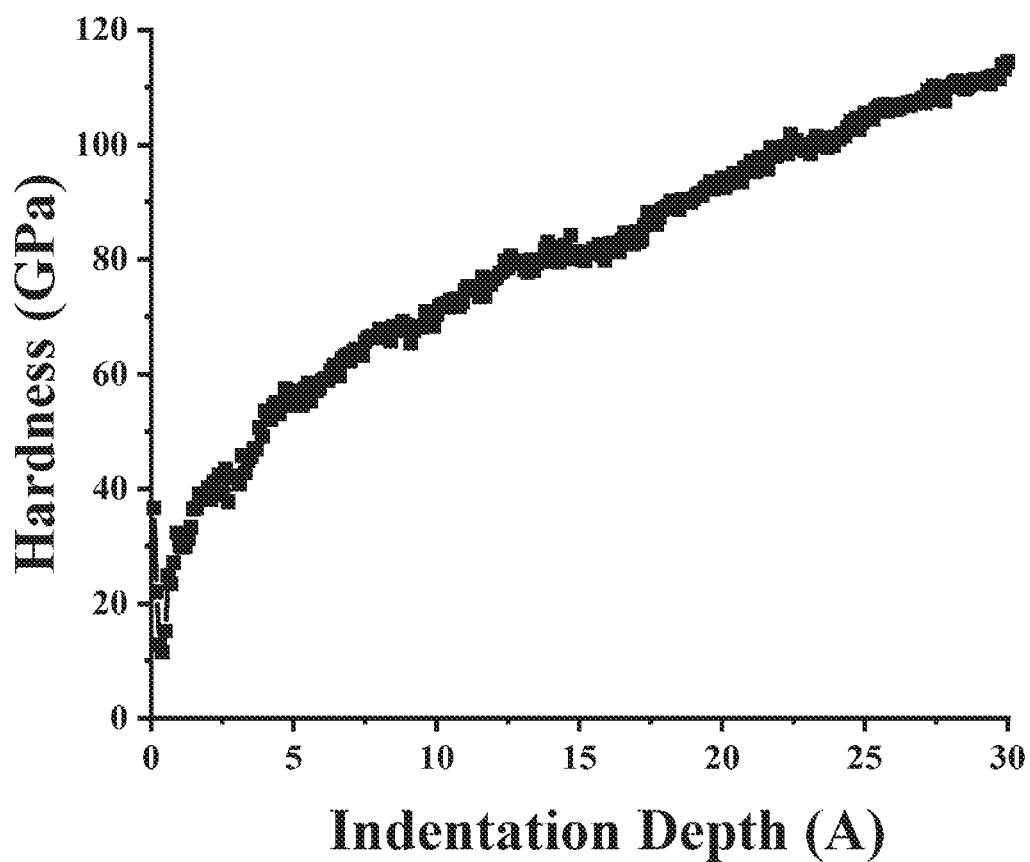

FIG. 9A depicts time phased snapshots of hardness testing of the composite material disclosed herein from initial conformation, to maximum load state, to fully released state. A spherical indenter was used to apply a load to the composite material. Rather than increasing the load, the indenter was pushed into the composite material and a measure of the force F was applied to the indenter and the area of the remaining maker A after the indenter was released. Nano-indentation hardness is represented as: H=F/A. Residue area of the spherical indenter is represented as: $A=\pi(R^2-(R-H)^2)$ where H is indentation depth and R is indenter radius. The nano-indentation hardness was a function of indenter radius size and the results are depicted in FIG. 9B as measured by indentation depth.

Heat Sink Testing.

Figure 10:
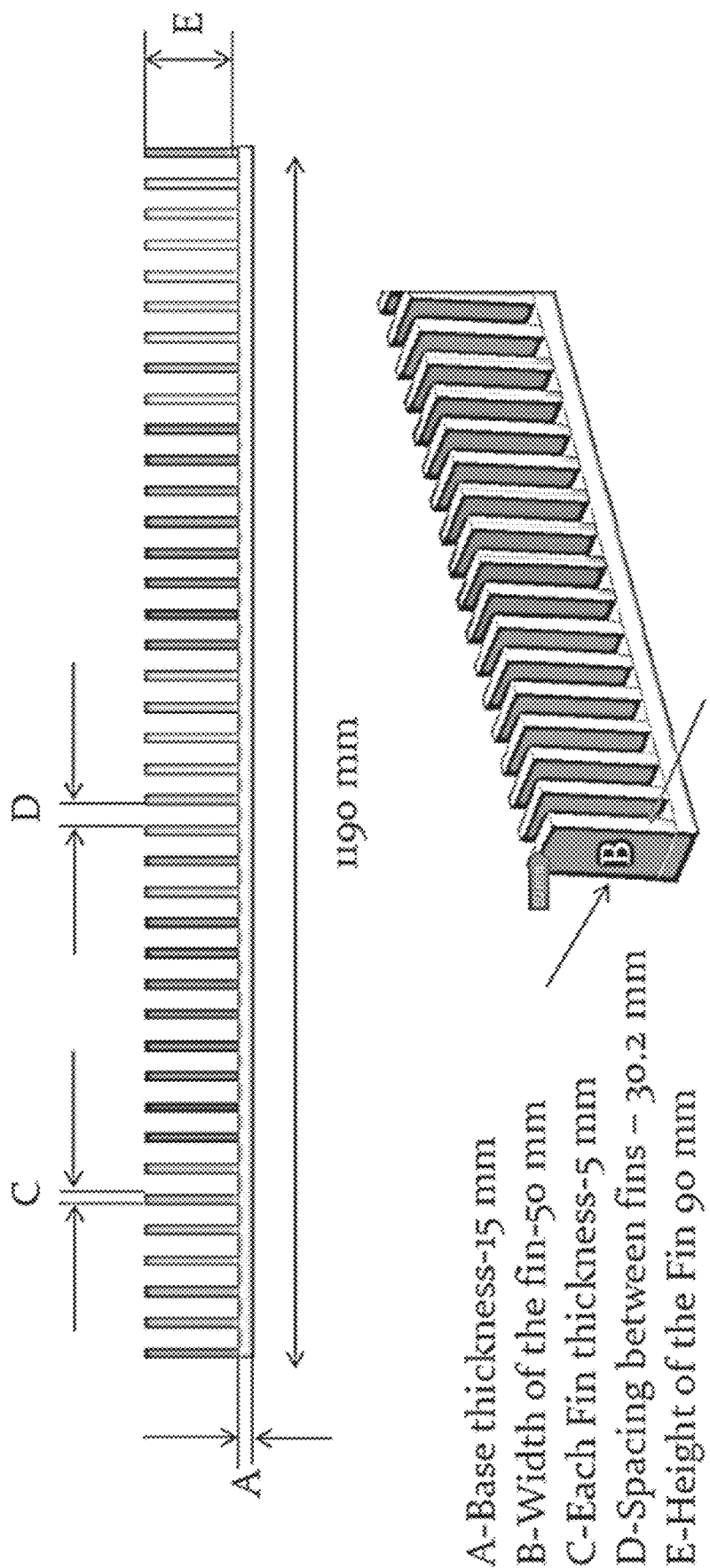
FIG. 10 is a schematic of a heat sink test bed geometry constructed of aluminum and the composite material disclosed herein.

Temperature distribution in an aluminum heat sink and temperature distribution in a heat sink constructed of the composite material disclosed herein were tested and compared to each other. The test bed geometry, the same for both materials, is shown in FIG. 10. Two heat sources generating 160 W each were placed 50 mm apart across a 500 mm span to determine the maximum temperature of the materials with ambient temperature at 22° C. The maximum temperature observed for aluminum was 52.6° C. and 22.4° C. for the composite material disclosed herein. The composite material dissipated all heat and remained near the ambient temperature.

Anode Material Modeling.

Figure 11:
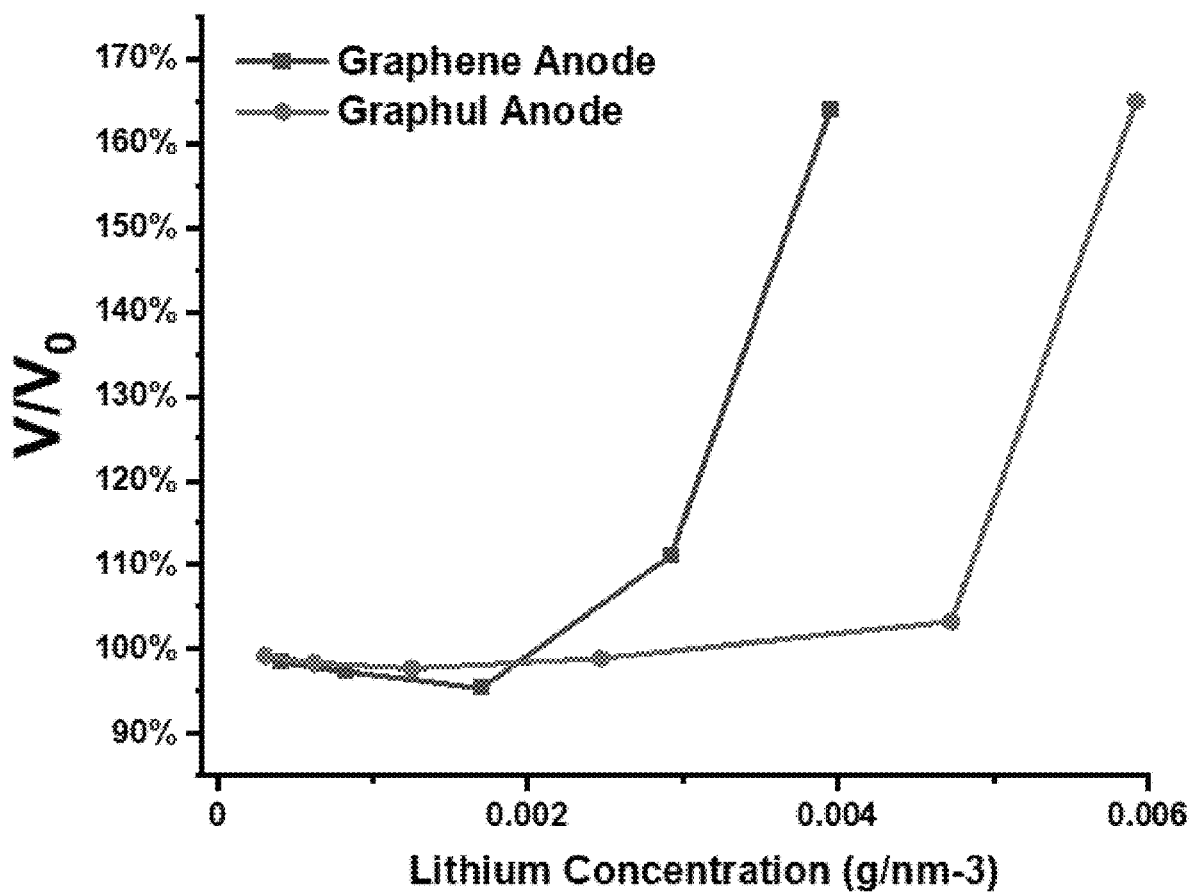
FIG. 11 graphically depicts lithium density versus volume expansion in a theoretical comparison of a commercial grade graphene anode and a simulated anode constructed of the composite material disclosed herein.

Graphene has been tested as anode material for rechargeable lithium-ion batteries and sodium-ion batteries due to its unique qualities. Lithium density and volume expansion were compared between a commercial graphene anode and a simulated anode model constructed of the composite material disclosed herein. Lithium concentration is proportional to the specific capacity represented as: S=aρ. The commercial graphene anode had a maximum volume expansion ratio of 10% (V/V0−1), corresponding to its maximum specific capacity under current technology/material limits. As shown in FIG. 11, under the same volume expansion of 10%, the composite material displayed about twice the lithium capacity indicating a greater theoretical specific capacity compared to graphene.

The modeling further indicated that the composite material disclosed herein should have a larger theoretical specific capacity at least 2-times greater-compared to a commercial grade graphene anode. Commercial-grade graphene anodes have a maximum capacity of about 600 mAh/g. As such, it is estimated that an anode constructed of the composite material disclosed herein should have a maximum capacity of at least 1200 mAh/g. In other examples, an anode constructed of the composite material disclosed herein may have a maximum capacity of at least twice that of any commercial-grade graphene anode. In addition, the composite material anode should have a minimal volume change during the charging and discharging process, as well as a higher lithium storage capability. The additional energy stored in the composite material anode should also provide a higher current that may drive a larger load.

Kevlar® v. Graphul™.

Figure 12:
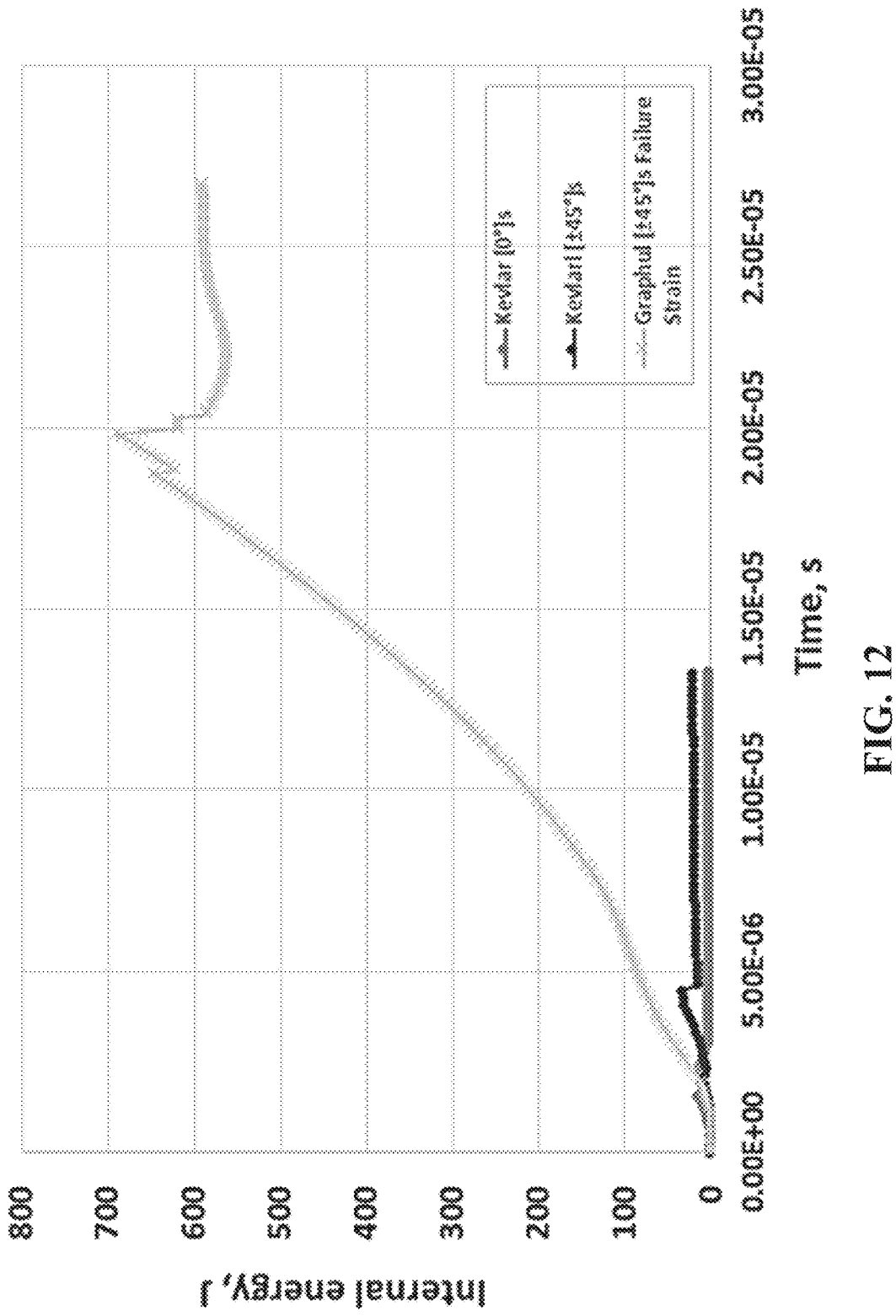
FIG. 12 illustrates the internal energy absorption between the composite material disclosed herein versus Kevlar®.

An analysis was conducted to calculate energy absorption capacity of traditional Kevlar® compared to the composite material disclosed herein under ballistic impact. The geometric model included a target plate thickness of about 1.6 mm and ballistics generated from a 7.62×39 mm rifle bullet having a velocity of about 730 m/s. Ballistic impact is a punch sheer-like test. As such, shear modulus of Kevlar® was compared to the shear modulus of the composite material disclosed herein. Testing indicated a similar shear modulus between both Kevlar® and the composite material. As shown in FIG. 12, the energy absorbed by the composite material disclosed herein is about 18 times higher compared to the Kevlar® laminate. In other examples, the energy absorbed by the composite material disclosed herein may be, for example, at least, greater than, less than, equal to, or any number in between about 2 times, 3 times, 4 times, 5 times, 6 times, 7 times, 8 times, 9 times, 10 times, 11 times, 12 times, 13 times, 14 times, 15 times, 16 times, 17 times, 18 times, 19 times, 20 times, 21 times, 22 times, 23 times, 24 times, 25 times, 26 times, 27 times, 28 times, 29 times, 30 times, 35 times, 40 times, 45 times, 50 times, 55 times, 60 times, 65 times, 70 times, 75 times, 80 times, 85 times, 90 times, 95 times, and 100 times higher than the energy absorbed by Kevlar®. Such performance indicates that the composite material would be suitable for body armor, or for use as other ballistic or explosive reinforcement material.

Steel Flange Coupling v. Graphul™ Composite Flange Coupling.

A comparative study was conducted to compare the structural performance of a steel (ASTM-A36) flange coupling with the performance of a composite material flange coupling. A baseline performance of the steel flange coupling was established and then compared to the performance of a similar flange coupling constructed of the composite material. The comparison was a typical composite laminate/structural design problem to compare performance characteristics. Since the flanges were under torsional load, torsional rigidity was increased while increasing the shear modulus by changing the layup. The ideal layup from an in-plane shear modulus point for the composite material analysis was $[\pm 45]_{ns}$. As shown in the results summary in FIG. 13, the composite material flange stresses were similar to the conventional steel flange, but with about $\frac{1}{10}^{th}$ the structural mass of the steel flange. In other examples, the structural device, when constructed of the composite material disclosed herein, may have, for example, at least, greater than, less than, equal to, or any number in between about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 39%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, and 99.9% less structural mass and/or density than that of steel. Again, for a flange under torsional load, the bi-axial ply layup (3$^{rd}$ row, FIG. 13) was best suited from a deflection and stress point of view for the analysis.

Steel I-Beam v. Graphul™ I-Beam.

Figure 14C:
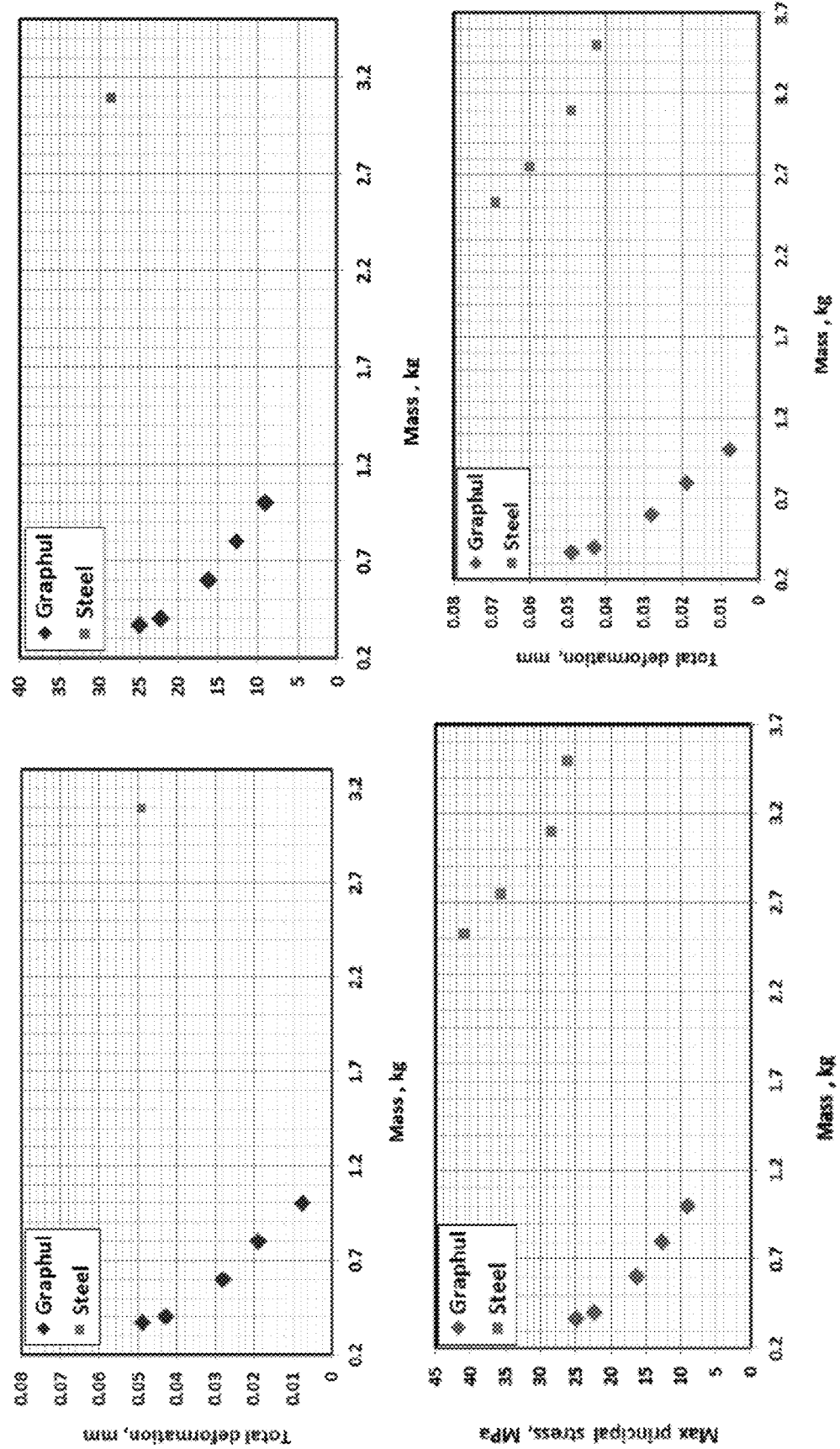

A comparative study was conducted to compare the structural performance of a steel (ASTM-A36) I-Beam to the structural performance of an I-Beam constructed of the composite material disclosed herein under a load of about 1500 N. As shown in the results summary of FIGS. 14A-14C, the I-Beam constructed of the composite material exceeded the deflection and stress criteria of the baseline steel I-Beam. Notably, a composite material I-Beam weighing about 400 grams produced similar stresses and deflections as a convention I-Beam weighing 3.5 kilograms while sustaining the same load.

Steel Pressure Vessel v. Graphul™ Pressure Vessel.

A comparative study of structural performance was conducted to compare the structural performance of a steel (ASTM-A36 & conventional IS-2062) pressure vessel to the performance of a pressure vessel constructed of the composite material disclosed herein under an internal pressure of 0.1 millibar and an external pressure of 1.0125 bar at 200° C. As shown in the materials and results summary of FIGS. 15A-15B, the composite material pressure vessel exhibited less stress compared to the baseline steel pressure vessel. Notably, stresses were similar between the steel and composite vessels, but the composite vessel had about $\frac{1}{10}^{th}$ the structural mass of the steel vessel. In other examples, the structural device, when constructed of the composite material disclosed herein, may have, for example, at least, greater than, less than, equal to, or any number in between about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 39%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, and 99.9% less structural mass and/or density than that of steel. As such, the composite material disclosed herein is optimal for use in the construction of pressure vessels and other related structures.

The composite material disclosed herein surpasses the mechanical qualities of conventional materials and technologies. What once required heavy machinery to lift and place, may now be accomplished without the heavy machinery due to the structural propensities and low densities of the composite material disclosed herein. For example, body armor may be constructed that may be 18 times lighter than what is currently commercially available, providing its users increased maneuverability due to its lightness that cannot be achieved with conventional materials. In another example, batteries, battery pouches, and batter cells may be constructed with twice the amount of power and a charging capability twice as fast as conventional systems for electrical vehicles to enable them to travel twice the distance of conventional electrical vehicles. Additionally, the non-corrosive nature of the composite material disclosed herein prolongs service life compared to metals that are prone to rusting or spalling. Furthermore, the semi-conductive nature of the composite material may allow for an electrical current to be placed throughout it thereby unlocking its use within various electrical applications. The future uses of composite material are endless and may include, for example, space elevators, cross-oceanic bridges, self-levitating highways, and the like. The composite material disclosed herein may also be used in next generation electric vehicle battery systems and for use as next generation is to lead the next generation building material systems within the construction industry.

The following may also be intended uses for the composite material and methods disclosed herein: body armor, semiconductors, battery anodes, solar panels, heat sinks, structural concrete members, structural steel members, precast concrete structural members, bridges, highways, streets, skyscrapers, sidewalks, foundations, dams, industrial plants, canals, airports, structural composites, aircraft, military equipment, and civil infrastructure.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, sub-combinations, and permutations of structure, operations, and/or other features described herein and in the accompanying drawing figures.

Although examples are described above, features and/or steps of those examples may be combined, divided, omitted, rearranged, revised, and/or augmented in any desired manner. Various alterations, modifications, and improvements will, in view of the foregoing disclosure, readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method of making a composite material comprising:
   depositing a plurality of fullerenes on a first graphene sheet forming a bottom plate;
   placing a second graphene sheet forming a top plate on a top of the plurality of fullerenes; and
   fusing the plurality of fullerenes to the first graphene sheet forming the bottom plate and the second graphene sheet forming the top plate, wherein the plurality of fullerenes are converted to fullerene-derived carbon columns, and wherein the composite material comprises a tensile strength in an x-axis parallel to a plane of the graphene sheets of at least 20 GPa.

2. The method of claim 1, wherein a laser is used to fuse the composite material.

3. The method of claim 2, wherein the laser is configured to emit energy having a frequency from 450 nm to 700 nm.

4. The method of claim 1, wherein the fullerene-derived carbon columns are positioned from about 0.5 nm to about 2 nm from each other.

5. The method of claim 4, wherein the fullerene-derived carbon columns are positioned at least 0.5 nm from each other.

6. The method of claim 5, wherein the fullerene-derived carbon columns are positioned from about 0.5 nm to 1 nm from each other.

7. The method of claim 6, wherein the fullerene-derived carbon columns are positioned about 0.81 nm from each other.

8. The method of claim 1, wherein the fullerene-derived carbon columns are positioned in a staggered pattern between the graphene sheets.

9. The method of claim 1, wherein the fullerene-derived carbon columns are positioned in a uniform pattern between the graphene sheets.

10. The method of claim 1, wherein the composite material comprises a maximum capacity of at least 1200 mAh/g.

* * * * *